US011726064B2

(12) United States Patent
Burtea et al.

(10) Patent No.: US 11,726,064 B2
(45) Date of Patent: Aug. 15, 2023

(54) ACOUSTIC PIPE CONDITION ASSESSMENT USING COHERENT AVERAGING

(71) Applicant: Mueller International, LLC, Atlanta, GA (US)

(72) Inventors: Valentin Mircea Burtea, Toronto (CA); Sebastien Perrier, Toronto (CA); Bruce Robertson, Toronto (CA)

(73) Assignee: Mueller International LLC, Atlanta, GA (US)

( * ) Notice: Subject to any disclaimer, the term of this patent is extended or adjusted under 35 U.S.C. 154(b) by 358 days.

(21) Appl. No.: 16/935,945

(22) Filed: Jul. 22, 2020

(65) Prior Publication Data

US 2022/0026395 A1 Jan. 27, 2022

(51) Int. Cl.
*G01N 29/02* (2006.01)
*G01N 29/024* (2006.01)
(Continued)

(52) U.S. Cl.
CPC ........... *G01N 29/024* (2013.01); *G01N 29/11* (2013.01); *G01N 29/4454* (2013.01);
(Continued)

(58) Field of Classification Search
CPC .. G01N 29/024; G01N 29/11; G01N 29/4454; G01N 29/4472; G01N 29/348; G01N 2291/0289; G06K 9/6215
See application file for complete search history.

(56) References Cited

U.S. PATENT DOCUMENTS 3,011,754 A 12/1961 Ander
3,216,244 A 11/1965 Borchers
(Continued)

FOREIGN PATENT DOCUMENTS

CN 1307675 8/2001
CN 202867884 4/2013
(Continued)

OTHER PUBLICATIONS

Huang, N. E., "The empirical mode decomposition and the Hilbert spectrum for nonlinear and non-stationary time series analysis", Proceedings of the Royal Society of London Series A, vol. 454, No. 1971, pp. 903-998, Copyright 1998, 93 pgs.
(Continued)

*Primary Examiner* — Tarun Sinha
(74) *Attorney, Agent, or Firm* — Taylor English Duma LLP

(57) ABSTRACT

Methods, systems, and computer-readable storage media for accurate time delay estimation using coherent averaging. A plurality of out-of-bracket acoustical impulses are generated in a pipe segment of a fluid distribution system. Signal data representing the acoustical impulses sensed at two locations along the pipe segment are recorded. Precise timings for the generation of the acoustical impulses are obtained, and the acoustical impulses in the signal data recorded from the first location are averaged based on the precise timings to produce a near-sensor average impulse. Similarly, the acoustical impulses in the signal data recorded from the second location are averaged based on the same precise timings to produce a far-sensor average impulse. A time delay between arrival of the plurality of out-of-bracket acoustical impulses at the first and second locations is estimated from the timing of the near-sensor average impulse and the far-sensor average impulse.

20 Claims, 15 Drawing Sheets

(51) Int. Cl.
  *G01N 29/11* (2006.01)
  *G01N 29/44* (2006.01)
  *G06F 18/22* (2023.01)
(52) U.S. Cl.
  CPC ......... *G01N 29/4472* (2013.01); *G06F 18/22* (2023.01); *G01N 2291/011* (2013.01); *G01N 2291/0289* (2013.01)

(56) References Cited

U.S. PATENT DOCUMENTS

| | | |
|---|---|---|
| 3,283,833 A | 11/1966 | Bodine, Jr. |
| 4,194,246 A | 3/1980 | Crist |
| 4,289,019 A | 9/1981 | Claytor |
| 4,929,898 A | 5/1990 | Spies |
| 5,031,446 A | 7/1991 | Saito et al. |
| 5,037,327 A | 8/1991 | Van Woensel |
| 5,416,724 A | 5/1995 | Savic |
| 5,526,689 A | 6/1996 | Coulter et al. |
| 5,531,099 A | 7/1996 | Russo |
| 5,581,037 A * | 12/1996 | Kwun ............... G01N 29/2412 73/622 |
| 5,836,787 A | 11/1998 | Kodama |
| 6,289,723 B1 | 9/2001 | Leon |
| 6,435,030 B1 | 8/2002 | Gysling et al. |
| 6,453,247 B1 | 9/2002 | Hunaidi |
| 6,556,924 B1 | 4/2003 | Kariyawasam et al. |
| 6,561,032 B1 | 5/2003 | Hunaidi |
| 7,007,545 B1 | 3/2006 | Martinek |
| 7,059,176 B2 | 6/2006 | Sparks |
| 7,095,676 B2 | 8/2006 | D'Angelo et al. |
| 7,203,322 B1 | 4/2007 | Bostock |
| 7,266,992 B2 | 9/2007 | Shamout et al. |
| 7,283,913 B2 | 10/2007 | Garnaes |
| 7,328,618 B2 | 2/2008 | Hunaidi et al. |
| 7,475,596 B2 | 1/2009 | Hunaidi et al. |
| 7,624,650 B2 | 12/2009 | Gysling et al. |
| 7,752,918 B2 | 7/2010 | Davis |
| 7,810,378 B2 | 10/2010 | Hunaidi et al. |
| 7,830,273 B2 | 11/2010 | Twitchell, Jr. |
| 7,940,189 B2 | 5/2011 | Brown |
| 7,962,293 B2 | 6/2011 | Gysling |
| 8,296,083 B2 | 10/2012 | Martin |
| 8,601,875 B2 | 12/2013 | Paulson |
| 8,695,418 B2 | 4/2014 | Sparks et al. |
| 8,816,866 B2 | 8/2014 | Day |
| 8,966,979 B2 | 3/2015 | Amundsen |
| 9,053,519 B2 | 6/2015 | Scolnicov et al. |
| 9,291,520 B2 | 3/2016 | Fleury, Jr. et al. |
| 9,541,432 B2 | 1/2017 | Kertesz |
| 9,651,445 B2 | 5/2017 | McIntyre |
| 9,670,650 B2 | 6/2017 | Pinney et al. |
| 9,799,204 B2 | 10/2017 | Hyland et al. |
| 9,816,848 B2 | 11/2017 | Raykhman et al. |
| 9,835,592 B2 | 12/2017 | Yusuf et al. |
| 10,067,092 B2 | 9/2018 | Burtea et al. |
| 10,209,225 B2 | 2/2019 | Perrier |
| 10,267,774 B2 | 4/2019 | Yusuf et al. |
| 10,509,012 B2 | 12/2019 | Perrier |
| 10,565,752 B2 | 2/2020 | Perrier et al. |
| 10,690,630 B2 | 6/2020 | Perrier et al. |
| 10,768,146 B1 | 9/2020 | Burtea et al. |
| 10,845,340 B2 | 11/2020 | Burtea et al. |
| 11,609,348 B2 | 3/2023 | Robertson et al. |
| 2001/0032064 A1 | 10/2001 | Araki et al. |
| 2003/0033870 A1 | 2/2003 | Shah et al. |
| 2003/0033879 A1 | 2/2003 | Adewumi |
| 2003/0185100 A1 | 10/2003 | D'Angelo et al. |
| 2004/0169108 A1 | 9/2004 | Terpay |
| 2005/0000289 A1 | 1/2005 | Gysling et al. |
| 2005/0210960 A1 | 9/2005 | Shamout et al. |
| 2006/0283251 A1 * | 12/2006 | Hunaidi ............... G01N 29/222 73/597 |
| 2007/0041333 A1 | 2/2007 | Twitchell |
| 2008/0078247 A1 | 4/2008 | Hunaidi et al. |
| 2008/0314122 A1 | 12/2008 | Hunaidi |
| 2009/0250125 A1 | 10/2009 | Howitt |
| 2010/0175477 A1 | 7/2010 | Kasai et al. |
| 2011/0161037 A1 | 6/2011 | Sutherland |
| 2012/0041694 A1 | 2/2012 | Stephens et al. |
| 2012/0055262 A1 | 3/2012 | Sinha |
| 2012/0125111 A1 | 5/2012 | Groos et al. |
| 2012/0167688 A1 | 7/2012 | Minachi et al. |
| 2013/0025375 A1 | 1/2013 | Goldner et al. |
| 2013/0036796 A1 | 2/2013 | Fleury et al. |
| 2013/0058819 A1 | 3/2013 | Kodama et al. |
| 2013/0211797 A1 | 8/2013 | Scolnicov |
| 2013/0213482 A1 | 8/2013 | Schuberth |
| 2013/0240093 A1 | 9/2013 | Okada |
| 2015/0247777 A1 | 9/2015 | Kondou |
| 2015/0300907 A1 | 10/2015 | Giunta et al. |
| 2016/0041286 A1 | 2/2016 | Sinha et al. |
| 2016/0208952 A1 | 7/2016 | Howitt |
| 2016/0223120 A1 | 8/2016 | Gagliardo |
| 2016/0252422 A1 | 9/2016 | Howitt |
| 2016/0290974 A1 | 10/2016 | Coleman |
| 2016/0370325 A1 | 12/2016 | Yusuf |
| 2017/0176395 A1 | 6/2017 | Burtea |
| 2017/0191966 A1 | 7/2017 | Niri et al. |
| 2017/0248555 A1 | 8/2017 | Yusuf et al. |
| 2018/0306753 A1 | 10/2018 | Perrier |
| 2018/0306755 A1 | 10/2018 | Perrier et al. |
| 2018/0308265 A1 | 10/2018 | Perrier et al. |
| 2018/0340912 A1 | 11/2018 | Burtea et al. |
| 2019/0128766 A1 | 5/2019 | Burtea et al. |
| 2019/0128767 A1 | 5/2019 | Burtea |
| 2019/0128848 A1 | 5/2019 | Perrier |
| 2019/0390990 A1 | 12/2019 | Krywyj et al. |
| 2020/0240821 A1 | 7/2020 | Ebert |
| 2022/0205357 A1 | 6/2022 | Robertson et al. |
| 2023/0017820 A1 | 1/2023 | Burtea et al. |

FOREIGN PATENT DOCUMENTS

| | | |
|---|---|---|
| CN | 2003404430 | 1/2014 |
| CN | 106289121 | 1/2017 |
| EP | 3392636 | 10/2018 |
| FR | 2754898 | 4/1998 |
| JP | 2002236115 | 8/2002 |
| KR | 20180079128 | 7/2018 |
| WO | 2003048713 | 6/2003 |
| WO | 2010020817 | 2/2010 |
| WO | 2014050618 | 4/2014 |
| WO | 2015031180 | 3/2015 |
| WO | 2015073313 | 5/2015 |
| WO | 2016160267 | 10/2016 |
| WO | 2016205082 | 12/2016 |
| WO | 2023003778 | 1/2023 |

OTHER PUBLICATIONS

Long, et al., Article entitled: "Axisymmetric Modes that Propagate in Buried Iron Water Pipes", View Affiliations AIP Conference Proceedings 657:1, Copyright 2003, 1201-1208, 8 pgs.
Yusuf, Shabbir; Issue Notification for U.S. Appl. No. 14/740,902, filed Jun. 16, 2015, dated Nov. 15, 2017, 1 pg.
Yusuf, Shabbir; Non-Final Office Action for U.S. Appl. No. 14/740,902, filed Jun. 16, 2015, dated Apr. 27, 2017, 22 pgs.
Yusuf, Shabbir; Notice of Allowance for U.S. Appl. No. 14/740,902, filed Jun. 16, 2015, dated Aug. 30, 2017, 5 pgs.
Yusuf, Shabbir; Supplemental Notice of Allowability for U.S. Appl. No. 14/740,902, filed Jun. 16, 2015, dated Sep. 15, 2017, 4 pgs.
Perrier, Sebastien; Issue Notification for U.S. Appl. No. 15/493,899, filed Apr. 21, 2017, dated Jan. 30, 2019, 1 pg.
Perrier, Sebastien; Notice of Allowance for U.S. Appl. No. 15/493,899, filed Apr. 21, 2017, dated Sep. 24, 2018, 13 pgs.
Perrier, Sebastien; Supplemental Notice of Allowance for U.S. Appl. No. 15/493,899, filed Apr. 21, 2017, dated Nov. 9, 2018, 6 pgs.
Perrier, Sebastien; Non-Final Office Action for U.S. Appl. No. 16/232,268, filed Dec. 26, 2018, dated Mar. 13, 2019, 15 pgs.

(56) References Cited

OTHER PUBLICATIONS

Perrier, Sebastien; Notice of Allowance for U.S. Appl. No. 16/232,268, filed Dec. 26, 2018, dated Sep. 6, 2019, 9 pgs.
Perrier, Sebastien; Supplemental Notice of Allowance for U.S. Appl. No. 16/232,268, filed Dec. 26, 2018, dated Nov. 22, 2019, 6 pgs.
Leinov et al., "Investigation of guided wave propagation and attenuation in pipe buried in sand", J of Sound and Vibration 347 (2015) 96-114.
Long et al., "The effect of soil properties on acoustic wave propagation in buried iron water pipes", AIP Conference Proceedings 615, 1310 (2002), 9 pgs.
Perrier, Sebastien; Corrected Notice of Allowance for U.S. Appl. No. 15/493,914, filed Apr. 21, 2017, dated Feb. 20, 2020, 6 pgs.
Perrier, Sebastien; Corrected Notice of Allowance for U.S. Appl. No. 15/493,914, filed Apr. 21, 2017, dated Mar. 6, 2020, 6 pgs.
Perrier, Sebastien; Corrected Notice of Allowance for U.S. Appl. No. 15/493,914, filed Apr. 21, 2017, dated May 22, 2020, 10 pgs.
Perrier, Sebastien; Ex Parte Quayle Action for U.S. Appl. No. 15/493,914, filed Apr. 21, 2017, mailed Jun. 13, 2019, 15 pgs.
Perrier, Sebastien; Notice of Allowance for U.S. Appl. No. 15/493,914, filed Apr. 21, 2017, dated Nov. 20, 2019, 19 pgs.
Perrier, Sebastien; Non-Final Office Action for U.S. Appl. No. 15/493,906, filed Apr. 21, 2017, dated Jul. 5, 2019, 22 pgs.
Perrier, Sebastien; Notice of Allowance for U.S. Appl. No. 15/493,906, filed Apr. 21, 2017, dated Oct. 2, 2019, 11 pgs.
Perrier, Sebastien; Office Action for European for serial No. 18166849.2, filed Apr. 11, 2018, dated Feb. 3, 2020, 6 pgs.
Perrier, Sebastien; Office Action for European for serial No. 18166849.2, filed Apr. 11, 2018, dated Sep. 19, 2019, 5 pgs.
Perrier, Sebastien; Non-Final Office Action for U.S. Appl. No. 15/493,914, filed Apr. 21, 2017, dated Dec. 14, 2018, 19 pgs.
Perrier, Sebastien; Extended European Search Report for serial No. 18166849.2, filed Apr. 11, 2018, dated Jul. 19, 2018, 7 pgs.
Burtea, Valentin Mircea; Notice of Allowance for U.S. Appl. No. 16/659,333, filed Oct. 21, 2019, dated Jan. 28, 2020, 18 pgs.
Burtea, Valentin Mircea; Supplemental Notice of Allowance for U.S. Appl. No. 16/659,333, filed Oct. 21, 2019, dated Jul. 31, 2020, 6 pgs.
Burtea, Valentin Mircea; Supplemental Notice of Allowance for U.S. Appl. No. 16/659,333, filed Oct. 21, 2019, dated May 6, 2020, 6 pgs.
Almeida, et al.; Article entitled: "On the Acoustic Filtering of the Pipe and Sensor in a Buried Plastic Water Pipe and Its Effect on Leak Detection: An Experimental Investigation", Sensors, Copyright 2014, 16 pgs.
De Almeida, et al.; Article entitled: "Measurement of Wave Attenuation in Buried Plastic Water Distribution Pipes", Journal of Mechanical Engineering, published on Apr. 1, 2014, 9 pgs.
Oelze, et al.; Article entitled: "Measurement of Attenuation and Speed of Sound in Soils", Soil Sci. Soc. Am. J., vol. 36, May-Jun. 2002, 9 pgs.
Yusuf, Shabbir; Office Action for Chinese patent application No. 201680043097.1, filed Jun. 10, 2016, dated Dec. 27, 2019, 20 pgs.
Muggleton, et al.; "Axisymmetric wave propagation in fluid-filled pipes: wavenumber measurements in vacuo and buried pipes," 581 Journal of Sound and Vibration, 270(1) (2004), 20 pgs.
Sewerin; Operating Instructions for Combiphon, dated Dec. 10, 2011; 32 pgs.
Coleman, Matthew Simon; Final Office Action for U.S. Appl. No. 14/674,851, filed Mar. 31, 2015, dated Dec. 15, 2017, 38 pgs.
Coleman, Matthew Simon; Final Office Action for U.S. Appl. No. 14/674,851, filed Mar. 31, 2015, dated May 21, 2018, 36 pgs.
Coleman, Matthew Simon; Non-Final Office Action for U.S. Appl. No. 14/674,851, filed Mar. 31, 2015, dated Jun. 16, 2017, 50 pgs.
Hay, Lindsay; "The Influence of Soil Properties on the Performance of Underground Pipelines", Department of Soil Science, The Faculty of Agriculture, The University of Sydney, Aug. 1984, 243 pgs.
Makar, et al.; "Failure Modes and Mechanisms in Gray Cast Iron Pipe", National Research Council Canada, Copyright 2000, 11 pgs.
Muster, et al.; "Life Expectancy of Cement Mortar Linings in Cast and Ductile Iron Pipes", Water Research Foundation, Copyright 2011, 192 pgs.
Rajani, et al.; "Impact of Soil Properties on pipe corrosion: re-examination of traditional conventions", National Research Council Canada, Sep. 2010, 17 pgs.
Rajani, et al.; "Investigation of Grey Cast Iron Water Mains to Develop a Methodology for Estimating Service Life", AWWA Research Foundation, Copyright 2000, 294 pgs.
Burtea, Valentin Mircea; Issue Notification for U.S. Appl. No. 14/974,351, filed Dec. 18, 2015, dated Mar. 21, 2018, 1 pg.
Burtea, Valentin Mircea; Non-Final Office Action for U.S. Appl. No. 14/974,351, filed Dec. 18, 2015, dated Nov. 3, 2017, 33 pgs.
Burtea, Valentin Mircea; Notice of Allowance for U.S. Appl. No. 14/974,351, filed Dec. 18, 2015, dated May 10, 2018, 10 pgs.
Burtea, Valentin Mircea; Supplemental Notice of Allowance for U.S. Appl. No. 14/974,351, filed Dec. 18, 2015, dated May 24, 2018, 6 pgs.
Burtea, Valentin Mircea; Supplemental Notice of Allowance for U.S. Appl. No. 14/974,351, filed Dec. 18, 2015, dated Aug. 10, 2018, 6 pgs.
Burtea, Valentin Mircea; Non-Final Office Action for U.S. Appl. No. 16/054,078, filed Aug. 3, 2018, dated Jun. 1, 2020, 47 pgs.
Burtea, Valentin Mircea; Notice of Allowance for U.S. Appl. No. 16/054,078, filed Aug. 3, 2018, dated Aug. 20, 2020, 5 pgs.
Burtea, Valentin Mircea; Supplemental Notice of Allowance for U.S. Appl. No. 16/054,078, filed Aug. 3, 2018, dated Oct. 23, 2020, 6 pgs.
Burtea, Valentin Mircea; Supplemental Notice of Allowance for U.S. Appl. No. 16/054,078, filed Aug. 3, 2018, dated Oct. 6, 2020, 6 pgs.
Yusuf, Shabbir; Issue Notification for U.S. Appl. No. 15/056,403, filed Feb. 29, 2016, dated Apr. 3, 2019, 1 pg.
Yusuf, Shabbir; Non-Final Office Action for U.S. Appl. No. 15/056,403, filed Feb. 29, 2016, dated Jan. 30, 2018, 29 pgs.
Yusuf, Shabbir; Non-Final Office Action for U.S. Appl. No. 15/056,403, filed Feb. 29, 2016, dated Mar. 9, 2018, 17 pgs.
Yusuf, Shabbir; Notice of Allowance for U.S. Appl. No. 15/056,403, filed Feb. 29, 2016, dated Jan. 2, 2019, 13 pgs.
Yusuf, Shabbir; Supplemental Notice of Allowance for U.S. Appl. No. 15/056,403, filed Feb. 29, 2016, dated Feb. 14, 2019, 6 pgs.
Coleman, Matthew Simon; International Preliminary Report on Patentability for PCT Application No. PCT/US2016/020889, filed Mar. 4, 2016, dated Oct. 12, 2017, 13 pgs.
Coleman, Matthew, Simon; International Search Report and Written Opinion for PCT Application No. PCT/US2016/020889, filed Mar. 4, 2016, dated Jun. 6, 2016, 14 pgs.
De Silva et al., Condition Assessment and Probabilistic Analysis to Estimate Failure Rates in Buried Pipelines, Thermo Scientific, In: Proceedings of ASTT 5th Conference. Aug. 2002 {Aug. 2002). Retrieved from <https://www.researchgate.net/profile/Magnus_Moglia/publication/236834972_Condition_Assessment_and_Probabilistic_Analaysis_to_Estimate_Failure_Rates_in_Buried_Pipelines/links/00b7d51945e4007c48000000/pdf>, 21 pgs.
Sheppard et al., Cast Iron Fitness for Purpose (HFP)—Final Report, Macaw Engineering, Ltd., Jun. 3, 2015, Retrieved from <http://www.smartemetworks.org/Files/Cast_Iron_Fitness_For_Purpose_{CIFFP)_151214123856.pdf>, 91 pgs.
Yusuf, Shabbir; International Preliminary Report on Patentability for serial No. PCT/US2016/036856, filed Jun. 10, 2016, dated Dec. 28, 2017, 9 pgs.
Yusuf, Shabbir; International Search Report and Written Opinion for serial No. PCT/US2016/036856, filed Jun. 10, 2016, dated Sep. 9, 2016, 10 pgs.
Yusuf, Shabbir; Examination Report for Australian patent application No. 2016280629, filed Jun. 10, 2016, dated Dec. 1, 2020, 4 pgs.
Yusuf, Shabbir; Examination Report for Australian patent application No. 2016280629, filed Jun. 10, 2016, dated Sep. 17, 2020, 4 pgs.
Baik, et al.; Article entitled: "Acoustic Attenuation, phase and group velocities in liquid-filled pipes: Theory, experiment, and examples of water and mercury", The Journal of the Acoustical Society of America, Nov. 2010, 16 pgs.

(56) References Cited

OTHER PUBLICATIONS

Fan, Peng; Article entitled: "Prevention of Industrial Noise and Vibration", Shenyang Publishing House, Dec. 1997, 7 pgs.
Yuan, et al.; Article entitled: "Noise Control Principles and Technologies", Northeastern University Press Shenyang, accessed on Apr. 22, 2020, 33 pgs.
Yusuf, Shabbir; Office Action for Chinese patent application No. 201680043097.1, filed Jun. 10, 2016, dated Jan. 4, 2021, 22 pgs.
Yusuf, Shabbir; Office Action for Chinese patent application No. 201680043097.1, filed Jun. 10, 2016, dated Apr. 21, 2021, 20 pgs.
Yusuf, Shabbir; Office Action for Chinese patent application No. 201680043097.1, filed Jun. 10, 2016, dated May 22, 2020, 15 pgs.
Baik, et al.; Article entitled: "Acoustic attenuation, phase and group velocities in liquid-filled pipes: Theory, experiment, and examples of water and mercury", The Journal of the Acoustic Society of America, vol. 128, No. 5, Nov. 1, 2010, 15 pgs.
Price, John; Article entitled: "Acoustic Waveguides", Jan. 22, 2008 (Jan. 22, 2008), XP055522269, Retrieved from the inventor: http://spot.colorado.edu/~pricej/downloads/AcousticWaveguides.pdf; retrieved on Nov. 8, 2018, 32 pgs.
Yusuf, Shabbir; Extended European Search Report for serial No. 16812182.0, filed Jun. 10, 2016, dated Nov. 21, 2018, 22 pgs.
Yusuf, Shabbir; Office Action for European serial No. 16812182.0, filed Jun. 10, 2016, dated Nov. 22, 2019, 6 pgs.
Yusuf, Shabbir; Office Action for European serial No. 16812182.0, filed Jun. 10, 2016, dated Nov. 26, 2020, 6 pgs.
Yusuf, Shabbir; Office Action for Malaysia patent application No. 2017704843, filed Jun. 10, 2016, dated May 11, 2021, 2 pgs.
Baik, et al.; Article entitled: "Acoustic attenuation, phase and group velocities in liquid-filled pipes . . . ", 2010 Acoustical Society of America, published Nov. 2010, 15 pgs.
Yusuf, Shabbir; Notice of Eligibility for Grant for Singapore patent application No. 11201710434V, filed Jun. 10, 2016, dated Mar. 29, 2019, 7 pgs.
Yusuf, Shabbir; Written Opinion for Singapore patent application No. 11201710434V, filed Jun. 10, 2016, dated May 31, 2018, 6 pgs.
Amir, et al.; Article entitled: "A discrete model for tubular acoustic systems with varying cross section—the direct and inverse problems. parts 1 and 2: Theory and experiment," Acustica, 81:450-474 (1995), 25 pgs.
Jonathan A Kemp; "Theoretical and experimental study of wave propagation in brass musical instruments (PhD thesis)," 2002, available at <http://www.kempacoustics.com/thesis/thesis.html>, 232 pgs.
Muggleton, et al.; ,"Axisymmetric wave propagation in buried, fluid-filled pipes: effects of wall discontinuities", Journal of Sound and Vibration 281 (2005) 849-867, 19 pgs.
Muggleton, et al.; "Wavenumber prediction of waves in buried pipes for water leak detection." J. Sound Vib. 2002, 249, 939-954 (2002), 16 pgs.
Baik, et al.; Article entitled: "Acoustic attenuation, phase and group velocities in liquid-filled pipes: Theory, experiment, and examples of water and mercury", J. Acoust. Soc. Am. 128(5), Nov. 2010, 15 pgs.
Yusuf, Shabbir; Office Action for Canadian patent application No. 2,989,333, filed Jun. 10, 2016, dated May 4, 2022, 4 pgs.
Yusuf, Shabbir; Summons to Attend Oral Proceedings for European application No. 16812182.0, filed Jun. 10, 2016, mailed Jul. 8, 2022, 7 pgs .
Robertson, Bruce; Notice of Allowance for U.S. Appl. No. 17/136,354, filed Dec. 29, 2020, dated Dec. 16, 2022, 56 pgs.
Burtea, Valentin Mircea; International Search Report and Written Opinion for PCT Application No. PCT/US22/37322, filed Jul. 15, 2022, dated Nov. 22, 2022, 14 pgs.
Yusuf, Shabbir; Office Action for Canadian patent application No. 2,989,333, filed Jun. 10, 2016, dated Feb. 21, 2023, 4 pgs.
Yusuf, Shabbir; Office Action for Chinese patent application No. 201680043097.1, filed Jun. 10, 2016, dated Feb. 20, 2023, 16 pgs.
Perrier, Sebastien; Summons to Attend Oral Proceedings for European application No. 18166849.2, filed Apr. 11, 2018, dated Jun. 16, 2023, 5 pgs.

* cited by examiner

ACOUSTIC PIPE CONDITION ASSESSMENT USING COHERENT AVERAGING

BRIEF SUMMARY

The present disclosure relates to technologies for improving predictions of the condition of pipes of a fluid distribution system by accurate time delay estimation using coherent averaging. According to some embodiments, a method comprises generating a plurality of out-of-bracket acoustical impulses in a pipe segment of a fluid distribution system and recording signal data representing the acoustical impulses sensed at a first location and a second location along the pipe segment. Precise timings for the generation of the acoustical impulses are obtained, and the acoustical impulses in the signal data recorded from the first location are averaged based on the precise timings to produce a near-sensor average impulse. Similarly, the acoustical impulses in the signal data recorded from the second location are averaged based on the same precise timings recovered from the signal data from the first location to produce a far-sensor average impulse. A time delay between arrival of the plurality of out-of-bracket acoustical impulses at the first and second locations is then estimated from the timing of the near-sensor average impulse and the far-sensor average impulse.

According to further embodiments, a computer-readable medium comprises processor-executable instructions that cause a computer system to receive a first signal data from a first acoustic sensor and a second signal data from a second acoustic sensor, the first signal data and second signal data representing a plurality of acoustical impulses sensed at a first location and a second location, respectively, bracketing a pipe segment of a pipe in a fluid distribution system. Precise timings of the plurality of acoustical impulses in the first signal data are recovered, and the plurality of acoustical impulses in the first signal data are averaged based on the precise timings to produce a near-sensor average impulse. The plurality of acoustical impulses in the second signal data are also averaged based on the same precise timings to produce a far-sensor average impulse, and a time delay between arrival of the plurality of acoustical impulses at the first and second locations is estimated from the timing of the near-sensor average impulse and the far-sensor average impulse.

According to further embodiments, a water distribution system comprises an acoustical impulse generator, a first acoustic sensor, a second acoustic sensor, and an acoustic analysis module. The acoustical impulse generator is in acoustical communication with a pipe in the water distribution system and is configured to generate a plurality of acoustical impulses in the pipe. The first and second acoustic sensors are in acoustical communication with the pipe at a first location and second location, respectively, and are configured to sense the plurality of acoustical impulses in the pipe to produce first signal data and second signal data representing the sensed acoustical impulses. The acoustic analysis module executes in a pipe assessment system and is configured to receive the first signal data and the second signal data and select a prototypical impulse from the plurality of acoustical impulses in the first signal data. A fixed time window encompassing the prototypical impulse is slid sample-by-sample through the first signal data while a correlation coefficient between the signal data in the fixed time window and the first signal data at each sample position is calculated. Precise timing for each acoustical impulse in the plurality of acoustical impulses is determined based on corresponding local maximums in the correlation coefficient. The plurality of acoustical impulses in the first signal data are averaged based on the precise timings of the plurality of acoustical impulses to produce a near-sensor average impulse. Similarly, the plurality of acoustical impulses in the second signal data are averaged based on the same precise timings of the plurality of acoustical impulses to produce a far-sensor average impulse. Signal envelopes are computed for the near-sensor average impulse and the far-sensor average impulse, and a time delay between arrival of the plurality of acoustical impulses at the first and second locations is estimated by measuring a time between a point on a rising edge of the signal envelope computed for the near-sensor average impulse and a corresponding point on the rising edge of the signal envelope computed for the far-sensor average impulse.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
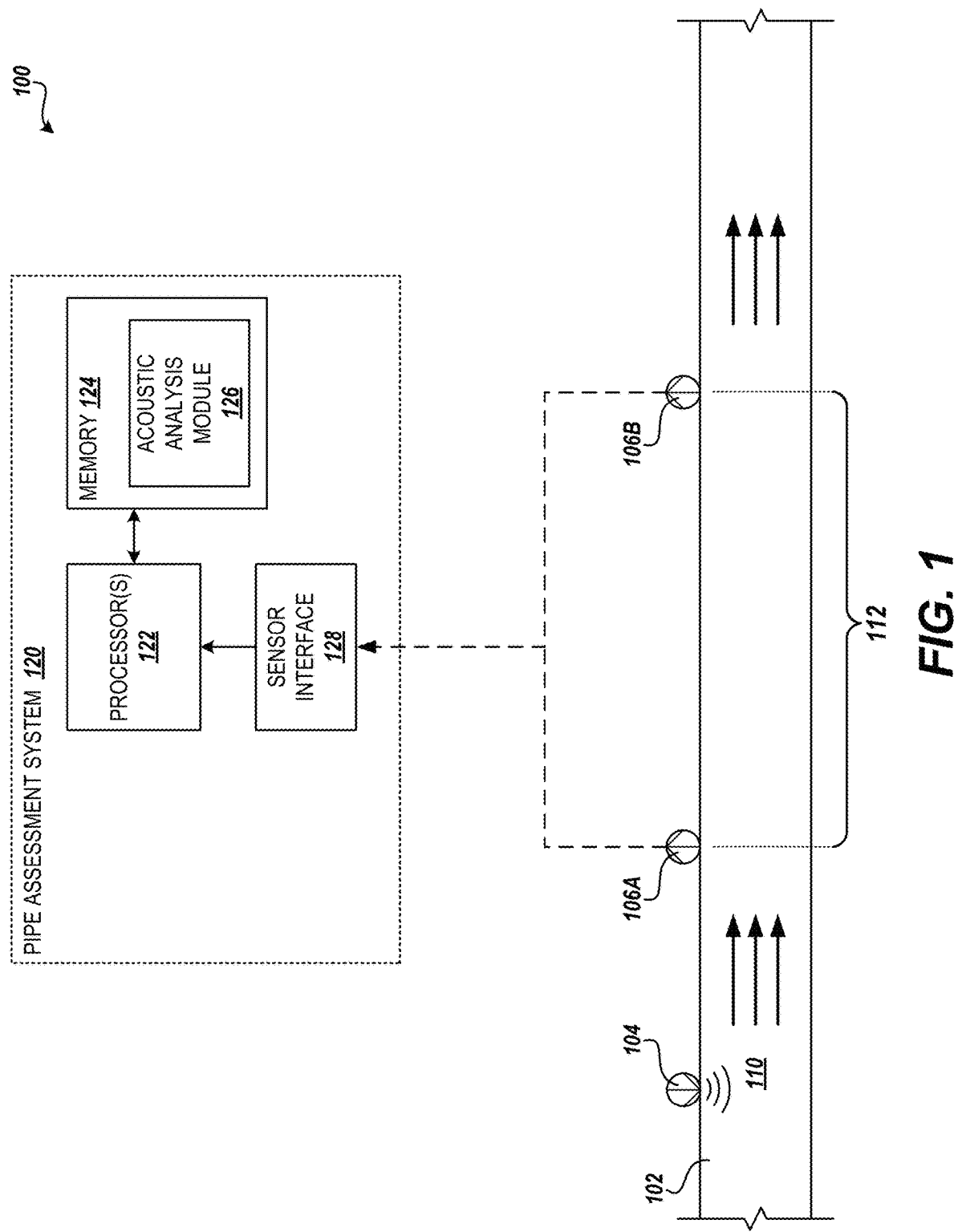
FIG. 1 is a block diagram showing one illustrative environment for the implementation of the embodiments described herein for improving predictions of the condition of pipes of a fluid distribution system, including estimating time delay of acoustic pulses between two sensors using coherent averaging.

The following detailed description is directed to technologies for improving predictions of the condition of pipes of a fluid distribution system by accurate time delay estimation using coherent averaging. Water distribution mains may degrade in several ways. For example, metal pipe walls may corrode and become thinner and weaker (less stiff). Asbestos cement pipes lose calcium and the wall losses strength in time. The wall of pre-stressed concrete pipes gets weaker if the steel wires break. These degradations may cause hydraulic failure of the distribution system.

As described in, e.g., U.S. patent application Ser. No. 09/570,922, filed May 15, 2000, and issued as U.S. Pat. No. 6,561,032; U.S. patent application Ser. No. 11/156,573, filed Jun. 21, 2005, and issued as U.S. Pat. No. 7,328,618; and U.S. patent application Ser. No. 11/952,582, filed Dec. 7, 2007, and issued as U.S. Pat. No. 7,475,596, the disclosures of which are incorporated herein by this reference in their entireties, methods for assessing the condition of, e.g., predicting the stiffness and/or wall thickness of, pipes of a water or other fluid distribution system may rely on measuring the speed of sound in a given pipe segment. The speed of sound may be determined by placing two acoustic or vibration sensors on the pipe or a component of the water system bracketing the pipe segment under test, and generating an out-of-bracket noise. The noise propagates along the pipe segment reaching first the near acoustic sensor, i.e. the sensor closest to the noise generator, and then the far acoustic sensor. The signals from the two sensors are recorded, and signal processing is applied to estimate the time delay between the noise reaching the near and far sensors (i.e., the time it takes for the sound to travel from one sensor to the other).

With the known distance between the two sensors and the estimated time delay, one can determine the propagation velocity of the noise down the pipe segment. The measured propagation velocity may then be compared with a reference speed of sound for that specific pipe class and material, with any differences used to determine the condition of the pipe segment under test. While these methods generally work well, there are circumstances for which a reliable estimation of the time delay is problematic, thus causing inaccurate assessment of condition of the pipes. For example, spurious signals caused by the pipe network topology, such as reflections, may introduce errors difficult to resolve. In addition, high levels of background noise in the signals due to traffic noise and/or other surface or sub-surface noise may further cause estimation problems.

According to embodiments described herein, systems and methods may be implemented utilizing an impulse noise source that allows for a time delay estimation that is relatively immune to the above mentioned spurious phenomena. An impulse excitation allows for a direct measurement of the delay using a time-of-flight approach by observing the precise time the impulse arrives at each sensor. While sound reflections affect the tail of an impulse, they may not affect the leading edge of the impulse. Therefore, measuring the time-of-flight between the leading edge of the two recorded impulses at the near and far sensors provides a more reliable time delay estimation, and thus more accurate condition assessment. In order to accurately identify the leading edge of the impulse(s) in the presence of the background noise, "coherent averaging" is employed to increase the signal-to-noise ratio by averaging multiple impulses while aligning the impulses in phase (hence, "coherent").

FIG. 1 and the following description are intended to provide a general description of a suitable environment in which the embodiments described herein may be implemented. In particular, FIG. 1 shows an environment 100 for assessing the condition, e.g. predicting the stiffness or wall thickness, of a pipe of a fluid distribution system, according to embodiments described herein. The environment 100 includes a pipe 102 containing the pipe segment to be tested. According to some embodiments, the pipe 102 may be a main in a water or other fluid distribution system that may include many pipes of various diameters and made of various materials, all connected in a fluid network. The fluid distribution system may further include other distribution system components, such as couplings, valves, hydrants, pumps, and the like, all connected together to form the fluid network, of which the pipe 102 is a part.

In some embodiments, the fluid network may be partially or wholly subterranean, or portions of the fluid network may be subterranean, while other portions of the fluid network may be non-subterranean (i.e., above ground). For example, the pipe 102 may be partially or wholly subterraneous while a hydrant or valve (not shown) connected to the pipe may be located above ground. In other embodiments, the pipe 102 may be partially subterraneous in that the pipe has portions exposed, such as to allow easy connection of sensor or testing devices (e.g., acoustical impulse generators and acoustic sensors described herein) to the pipe.

The environment 100 further includes an acoustical impulse generator 104 and two or more vibration or acoustic sensors, such as acoustic sensors 106A and 106B (referred to herein generally as acoustic sensors 106), inserted into a fluid path 110 of the pipe 102, attached to an outside of the pipe wall, or otherwise in acoustical communication with the pipe. For purposes of this disclosure, a component or device being "in acoustical communication with" the pipe 102 represents the component being connected directly or indirectly to the pipe in such a way that vibrations, acoustical impulses, or other variations in pressure traveling through the pipe wall and/or the fluid in the pipe can be produced or sensed by the component.

According to embodiments, the acoustical impulse generator 104 generates a series of acoustical impulses, i.e., a vibrations or longitudinal pressure waves, within a fluid path 110 of the pipe 102. The acoustical impulse generator 104 may comprise any means suitable for the creation of acoustical impulses or vibrations in the pipe 102 according to defined parameters, such as interval and intensity, including a mechanical device, such as a motorized hammer or piston for striking the pipe wall, an electro-mechanical device, such as a speaker or hydrophone, a manually actuated device, such as a human with a hammer, and the like. In further embodiments, a valve may be opened and closed one or more times so as to generate an acoustical impulse within fluid path 110. It will be understood that many other techniques may be implemented to cause the acoustical impulses to be generated in the fluid path 110. The acoustical impulse generator 104 may be attached to and/or act upon an outer wall of the pipe 102 or on a component of the fluid distribution system in fluid communication with the pipe, such as a hydrant or valve. In other embodiments, the parts of the acoustical impulse generator 104 may extend partially or wholly into the fluid path 110, or may be located in proximity to the external surface of the pipe 102 and transmit acoustic energy through the soil surrounding the pipe.

The acoustic sensors 106 measure the sound pressure of the acoustical impulses propagating through the pipe 102. In some embodiments, the acoustic sensors 106 may comprise hydrophones inserted into the fluid path 110. In other embodiments, the acoustic sensors may comprise transducers or accelerometers attached to the outer wall of the pipe 102 or to a component in fluid communication with the pipe, such as a hydrant. The transducers or accelerometers may measure the instantaneous acceleration of the pipe wall from vibrations caused by the sound pressure of the acoustical impulses. The measured acceleration of the wall constitutes an indirect measurement of sound pressure in the pipe. In further embodiments, the acoustic sensors 106 may include hydrophones, transducers, accelerometers, or any combination of these and other sensors known in the art for measuring vibrations or acoustic signals.

In some embodiments, two acoustic sensors 106A and 106B are placed in acoustical communication with the pipe at a specific distance apart, bracketing the specific pipe segment 112 for testing, also referred to herein as the "target pipe segment 112," as shown in FIG. 1. According to embodiments, the length of the pipe segment 112 may be hundreds of centimeters, hundreds of meters, or several kilometers apart. In some embodiments, the acoustic sensors 106A and 106B may be connected to the same pipe, such as pipe 102, as further shown in FIG. 1.

According to some embodiments, the acoustical impulse generator 104 is located outside of the pipe segment 112 between the two acoustic sensors 106A and 106B, referred to herein as being located "out-of-bracket." The acoustic sensors 106A and 106B sense the acoustical impulses in the pipe 102 generated by the acoustical impulse generator 104 at their respective locations. The acoustic sensors 106A and 106B may also pickup background noise, such as road traffic or other surface or subsurface activity, and spurious acoustical events, such as a truck hitting a metal construction plate on a nearby roadway.

The acoustic sensors 106A and 106B each produce a signal representing the sensed sounds, and signal data representing the sensed signal from the respective acoustic sensors 106A and 106B are sent to a pipe assessment system 120. The pipe assessment system 120 processes and analyzes the signal data received from the acoustic sensors 106A and 106B to determine a condition of the segment 112 of the pipe 102 bracketed by the sensors utilizing the methods and technologies described herein. It will be appreciated that the condition of the target pipe segment 112 may be representative of the condition of the pipe 102 or pipe network as a whole.

Generally, the pipe assessment system 120 represents a collection of computing resources for the processing and analysis of the signal data received from the acoustic sensors 106 and determination pipe condition. According to embodiments, the pipe assessment system 120 may comprise one or more computer devices and/or computing resources connected together utilizing any number of connection methods known in the art. For example, the pipe assessment system 120 may comprise a mobile computer device, such as a laptop or tablet, deployed in the field in proximity to the target pipe segment 112. Alternatively or additionally, the pipe assessment system 120 may comprise laptop or desktop computers; tablets, smartphones or mobile devices; server computers hosting application services, web services, database services, file storage services, and the like; and virtualized, cloud-based computing resources, such as processing resources, storage resources, and the like, that receive the signal data from the acoustic sensors 106 through one or more intermediate communication links or networks.

According to embodiments, the pipe assessment system 120 includes one or more processor(s) 122. The processor(s) 122 may comprise microprocessors, microcontrollers, cloud-based processing resources, or other processing resources capable executing instructions and routines stored in a connected memory 124. The memory 124 may comprise a variety non-transitory computer-readable storage media for storing processor-executable instructions, data structures and other information within the pipe assessment system 120, including volatile and non-volatile, removable and non-removable storage media implemented in any method or technology, such as RAM; ROM; FLASH memory, solid-state disk ("SSD") drives, or other solid-state memory technology; compact disc ROM ("CD-ROM"), digital versatile disk ("DVD"), or other optical storage; magnetic hard disk drives ("HDD"), hybrid solid-state and magnetic disk ("SSHD") drives, magnetic tape, magnetic cassette, or other magnetic storage devices; and the like.

Figure 4A:
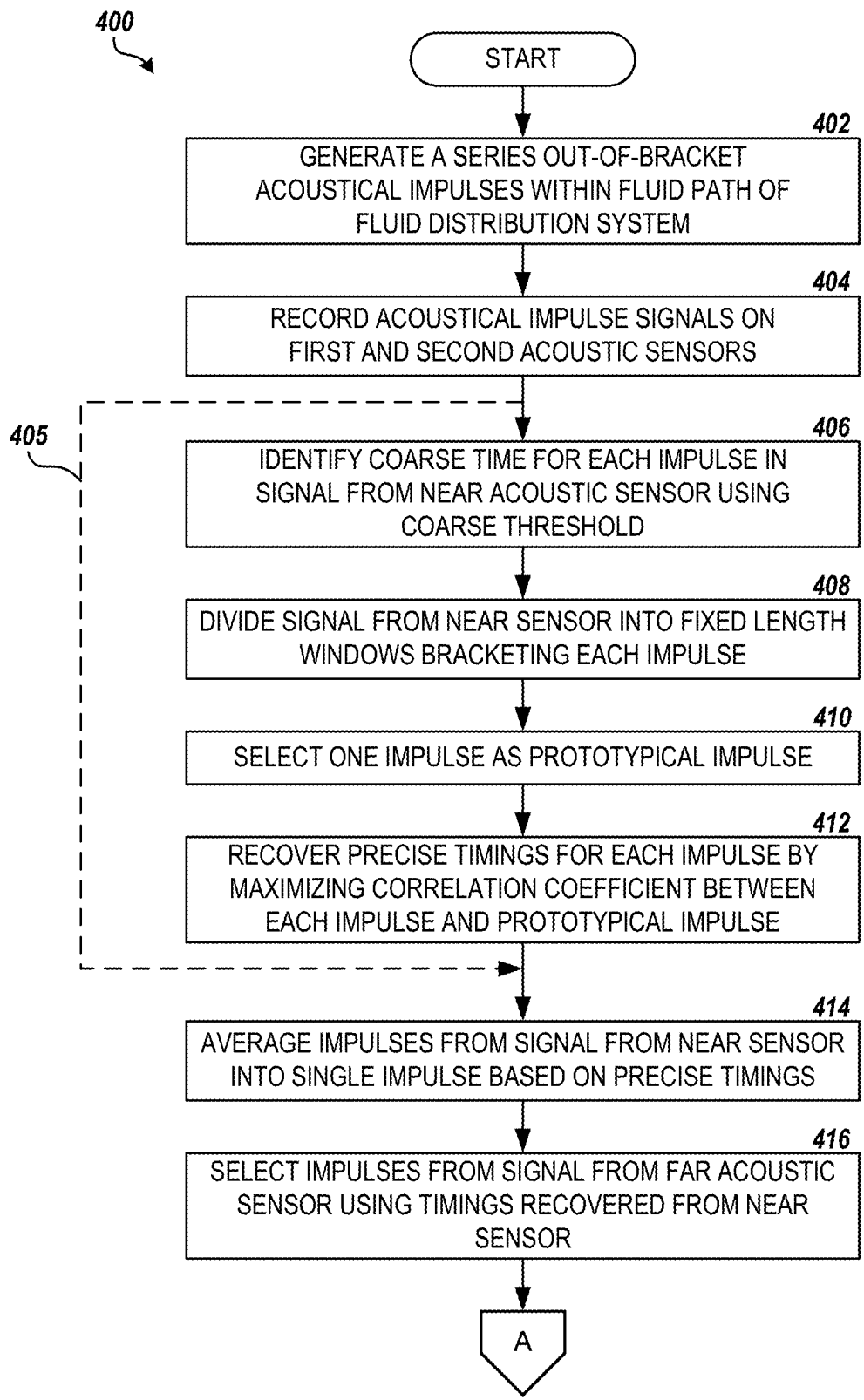
FIGS. 4A and 4B are flow diagrams showing one method for accurately estimating a time delay between sensing acoustical impulses in two sensors bracketing a pipe segment using coherent averaging, according to embodiments presented herein.

In some embodiments, the memory 124 may include an acoustic analysis module 126 for performing the acoustic analysis of the signal data from the two acoustic sensors 106A and 106B to accurately estimate the time delay between the two sensors using coherent averaging, as described herein. The acoustic analysis module 126 may include one or more software programs, components, and/or modules executing on the processor(s) of the pipe assessment system 120. The acoustic analysis module 126 may further include hardware components specifically designed to perform one or more steps of the routines described herein. According to further embodiments, the memory 124 may store processor-executable instructions that, when executed by the processor(s) 122, perform some or all of the steps of the routine 400 described herein for accurately estimating a time delay between sensing acoustical impulses in two sensors bracketing a pipe segment using coherent averaging, as described in regard to FIGS. 4A and 4B.

The pipe assessment system 120 may be in direct communication with the acoustic sensors 106 over a wired connection, or may be indirectly connected to the sensors and impulse generator through one or more intermediate communication links and/or computing devices. For example, a laptop may be connected to the acoustic sensors 106A and 106B via one or more radio-frequency ("RF") links to receive signal data from the sensors. In other embodiments, the signal data from each acoustic sensor 106 may be received by individual computing device and sent to a central analysis computer for processing and analysis. In such embodiments, it may be necessary to ensure that the clocks of the individual computing devices are synchronized or share a highly-accurate time source in order to ensure accurate timing accompanies the signal data from the respective acoustic sensors 106.

According to some embodiments, the processor(s) 122 are operatively connected to acoustic sensors 106 through a sensor interface 128. The sensor interface 128 allows the processor(s) 122 to receive the signals from the sensors representative of the sensed acoustical impulses in the pipe 102. For example, the sensor interface 128 may utilize one or more analog-to-digital converters ("ADCs") to convert an analog voltage output of the acoustic sensors 106 to a digital value that is sampled by the processor(s) 122 at a specific sampling rate sufficient to represent the acoustical impulses in the signal data. According to some embodiments, a sampling rate around 10 kHz may be utilized to capture data representing the frequencies of interest in the acoustical impulses. In further embodiments, the sound processing unit, or "sound card" of the laptop computer may be utilized to provide the sampling functionality.

Figure 2:
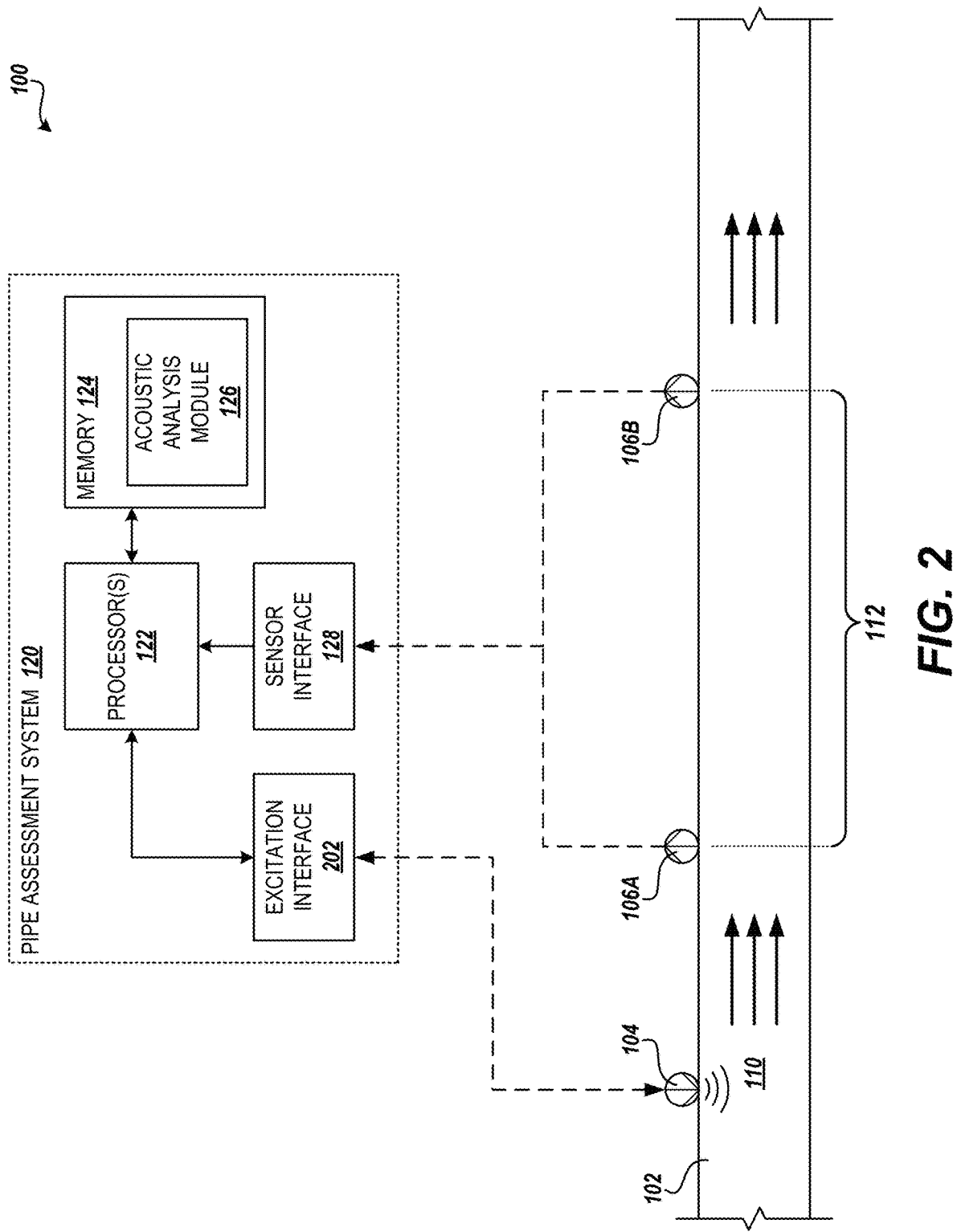
FIG. 2 is a block diagram showing an alternative environment for the implementation of the embodiments described herein.

In further embodiments, the pipe assessment system 120 may also be connected directly or indirectly to the acoustical impulse generator 104 through an excitation interface 202, as shown in FIG. 2. The excitation interface 202 may allow the processor(s) 122 to control the acoustical impulse generator 104 to generate acoustical impulses in the pipe 102 with a specific interval (period) and/or a specific intensity. The excitation interface 202 may further allow the processor (s) 122 to receive precise timing information for the generation of the acoustical impulses by the acoustical impulse generator 104 in the pipe 102.

It will be appreciated that the structure and/or functionality of the pipe assessment system may be different that that illustrated in FIGS. 1 and 2 and described herein. For example, one or more of the processor(s) 122, memory 124, sensor interfaces 128, excitation interfaces 202, and/or other components and circuitry described may be integrated within a common integrated circuit package or distributed among multiple integrated circuit packages in one or more computing devices. In some embodiments, some or all of the processing and analysis described herein may be implemented as software applications on mobile computing platforms, such as a smartphone or laptop with cellular networking capability. Similarly, the illustrated connection pathways are provided for purposes of illustration and not of limitation, and some components and/or interconnections may be omitted for purposes of clarity. It will be further appreciated that pipe assessment system 120 may not include all of the components shown in FIGS. 1 and 2, may include other components that are not explicitly shown in FIGS. 1 and 2, or may utilize architectures completely different than those shown in FIGS. 1 and 2.

Figure 3:
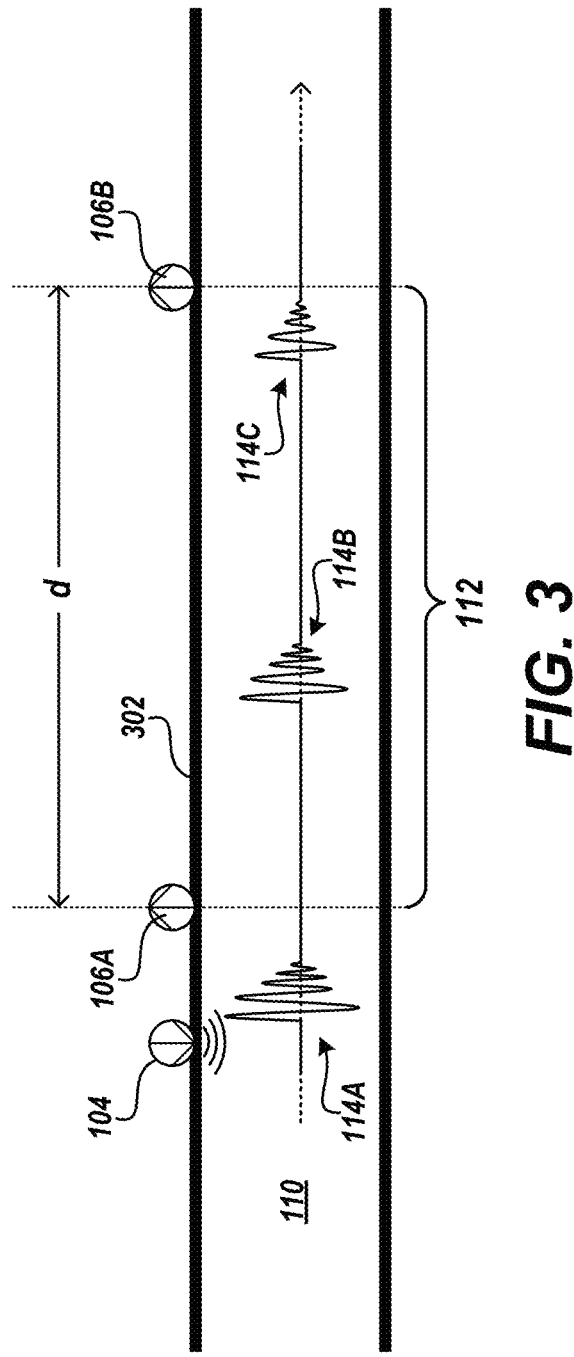
FIG. 3 is a sectional view showing a cross-section in the longitudinal direction of the pipe showing additional details of a time delay of acoustical pulses between two sensors, according to embodiments presented herein.

FIG. 3 shows additional details of a pipe 102 of a fluid distribution system and the traversal of acoustical impulses through the fluid contained therein. Acoustical impulses generated in the fluid path 110 of a pipe 102, such as acoustical impulses 114A-114C (referred to herein generally as acoustical impulses 114), will travel longitudinally down the pipe at a certain speed. By accurately measuring the time that it takes the impulses to travel between the two acoustic sensors 106A and 106B (referred to herein generally as the "time delay") at known distance d apart, and accurate speed of sound in the fluid path 110 of the pipe segment 112 may be computed. By comparing the computed speed of sound to models of speeds of sound in pipes of known characteristics and conditions, the condition of the pipe segment 112, e.g., the thickness and/or stiffness of the pipe wall 302, may be determined. However, accurate measurement of the time delay is hampered by background noise in the recorded signals, reflections from buildup on the inside of the pipe wall, spurious signal data from external noise occurrences during the recordings, inaccurate clocks and time measurements at individual computing devices in the pipe assessment system 120, and the like.

FIG. 4 illustrates one routine 400 for accurately estimating a time delay between sensing acoustical impulses in two sensors bracketing a pipe segment using coherent averaging, according to some embodiments. In some embodiments, the routine 400 may be performed by the acoustic analysis module 126 executing on a laptop computer in direct connection with the acoustic sensors 106A, 106B associated with the target pipe segment 112. In other embodiments, the routine 400 may be performed by some combination of the processor(s) 122, computing devices, components, and modules of the pipe assessment system 102.

The routine 400 begins at step 402, where a series of acoustical impulses 114 are generated in the pipe wall 302 and/or fluid path 110 of the target pipe segment 112. This may be performed the acoustical impulse generator 104. For example, the acoustical impulses 114 may be generated by manual operation of the acoustical impulse generator 104 by a human operator. In further embodiments, the pipe assessment system 120 or acoustic analysis module 126 may schedule a time to perform the data collection and analysis, and may control the acoustical impulse generator 104 at the scheduled time to produce the acoustical impulses 114 in the pipe segment 112 to facilitate the analysis. In some embodiments, the acoustical impulses 114 may be generated "out-of-bracket," i.e., in the same pipe 102 as the target pipe segment 112 but outside of the segment bracketed by the acoustic sensors 106A and 106B.

According to embodiments, generation of the acoustical impulses 114 may comprise excitation of the pipe and/or fluid using a pulsating source, such as a manual or mechanical impact (referred to herein as "tapping") of the pipe wall or a component in fluid connection with the pipe, such as a hydrant. In further embodiments, the excitation of the pipe/fluid may be produced by a speaker or other acoustic device attached to the pipe wall 302 or inserted into the fluid path 110 and driven to produce high amplitude impulses within the pipe wall and/or fluid path. The acoustical impulses 114 may be generated by the acoustical impulse generator 104 at a specific interval (period) and/or a specific intensity (amplitude) according to the requirements of the remaining acoustic analysis algorithm. For example, the interval between acoustical impulses 114 and may depend upon the length of the target pipe segment 112, the size or type of the pipe 102, the material of the pipe wall 302, the speed of sound in the pipe and/or fluid within the pipe, and the like.

Figure 5:
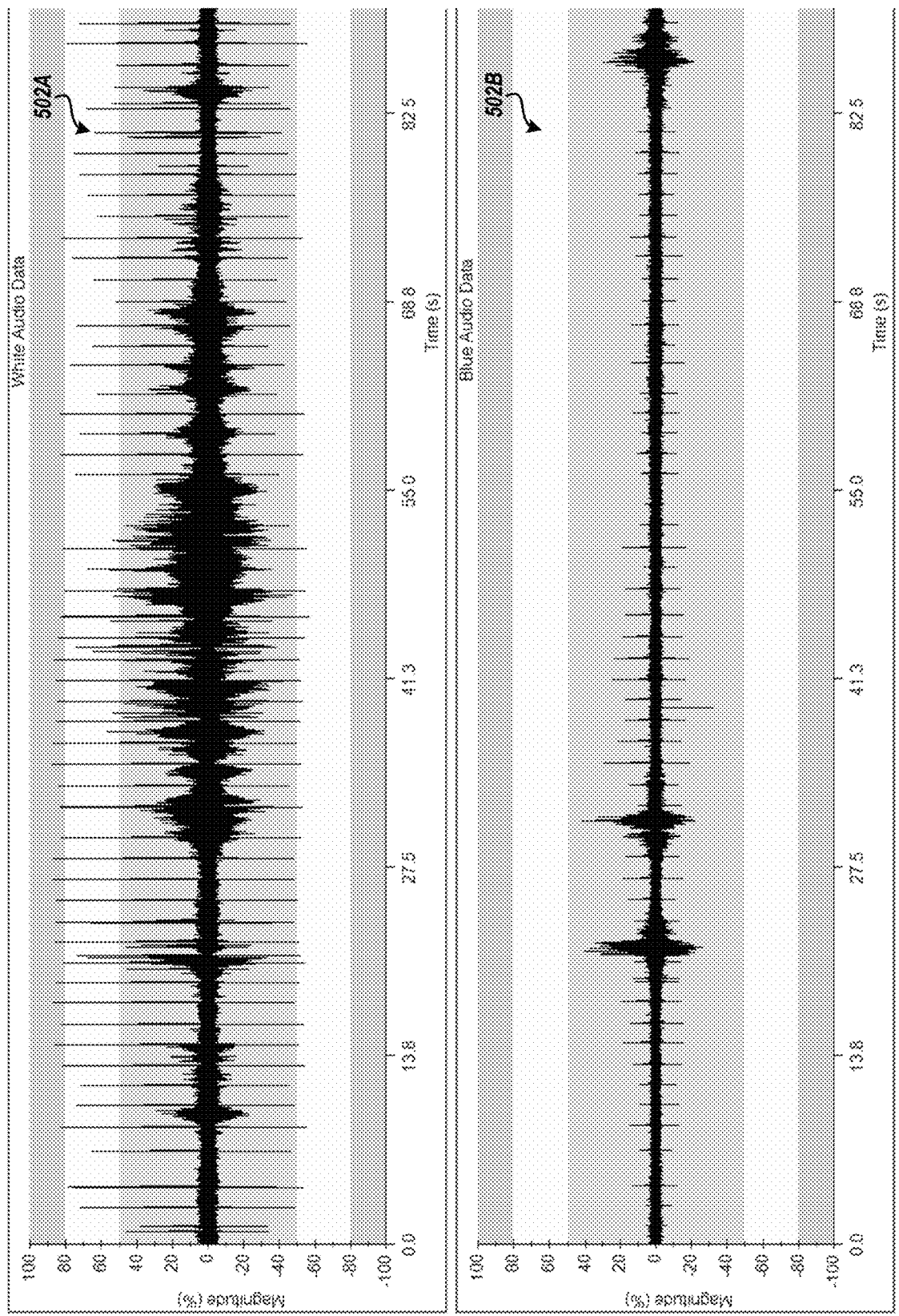
FIG. 5 shows signal graphs of a portion of exemplary signal data recorded from a near acoustic sensor and a far acoustic sensor attached to a pipe or component, according to some embodiments.

Next, the routine 400 proceeds from step 402 to step 404, where the acoustic analysis module 126 receives signal data from the first and second acoustic sensors 106A and 106B representing the measurement of the acoustical impulses 114 in the pipe 102 at either end of the target pipe segment 112. For example, as shown in FIG. 5, signal data 502A (referred to herein generally as signal data 502) recorded at acoustic sensor 106A and signal data 502B recorded at acoustic sensor 106B may be collected in the pipe assessment system 120. The processor(s) 122 of the pipe assessment system 120 may sample the signals from the sensors through the ADC(s) of the sensor interface 128 at a rate sufficient to represent the frequency and amplitude of the selected excitation frequencies of the acoustical impulses 114 produced by the acoustical impulse generator 104. According to some embodiments, sampling of the lower frequency ranges, e.g., from 10-1000 Hz for metal pipes, may produce the most useable signal data, and low-pass filters may be employed with the acoustic sensors 106A and 106B. Accordingly, sampling rates in the range of 10 kHz to 12 kHz may be utilized, according to some embodiments. In one embodiment, a sampling rate of 11,025 Hz may be used.

According to further embodiments, the signal data 502 may be recorded and stored in a buffer in the memory 124 for later analysis by the acoustic analysis module 126 or for transmission to a central analysis computer in the pipe assessment system 120. In further embodiments, the acoustic analysis module 126 may also receive data from the acoustical impulse generator 104 (or a sensor in close proximity to the acoustical impulse generator) containing precise timing information regarding the generation of the acoustical impulses 114 (the "tapping") in the pipe 102 that can be used in the analysis of the signal data from the acoustic sensors in lieu of the recovered precise timings of the impulses described below, as indicated by line 405 of FIG. 4A.

Once the signal data 502 from the two acoustic sensors 106A and 106B has been received, the routine 400 proceeds from step 404 to step 406, where the acoustic analysis module 126 identifies a course timing of the acoustical impulses 114 in the signal data recorded from the acoustic sensor 106 having the strongest signal-to-noise ratio ("SNR"), typically the sensor nearest to acoustical impulse generator 104, such as acoustic sensor 106A from FIGS. 1 and 3B. The acoustic sensor having the strongest SNR value may be referred to herein as the "near acoustic sensor 106A" or "near sensor."

Figure 6:
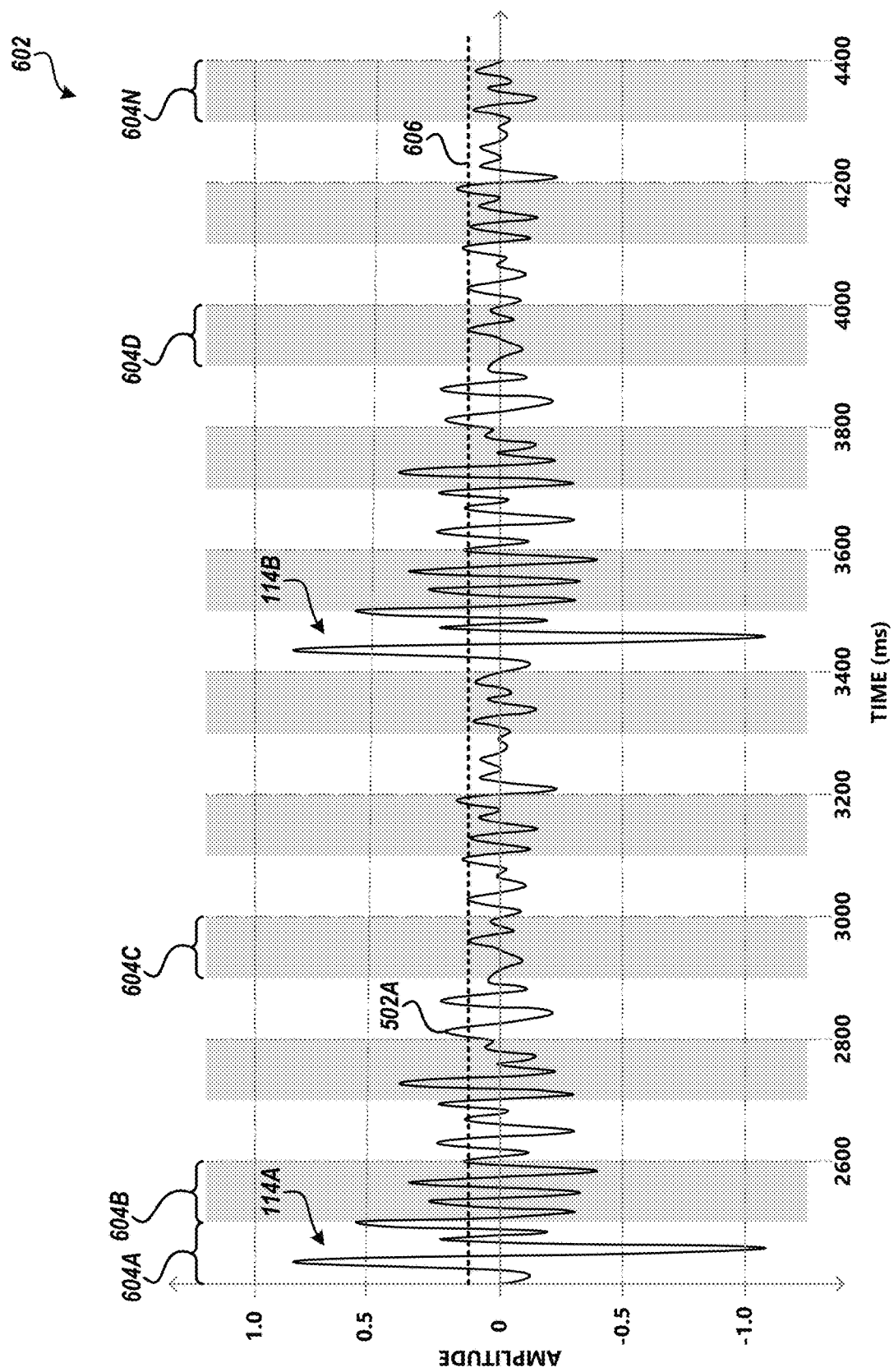
FIG. 6 is a signal graph of a portion of exemplary signal data recorded from a near acoustic sensor showing the signal data divided into small time-division frames, according to embodiments presented herein.

In some embodiments, a min/max algorithm may be employed to locate the acoustic impulses 114 in the signal data 502. The signal data 502A from the near acoustic sensor 106A is first divided into small time-division frames, such as frames 604A-604N (referred to herein generally as small frames 604), as shown in the signal graph 602 of FIG. 6. The size of the small frames 604 may be selected such that the frames are smaller than the interval of the acoustical impulses, such as acoustical impulses 114A and 114B. For example, if the acoustical impulse generator 104 is driven to deliver one acoustical impulse 114 approximately every second, the signal data 502A from the near acoustic sensor 106A may be divided into small frames 604 representing 0.1 seconds. A peak amplitude of the signal in each small frame 604 is then determined, and the frames are sorted according to their respective peak amplitude values. A value that is indicative of a background noise threshold 606 may then be determined from a subset of the small frames 604 of the signal data from the near acoustic sensor 106A having the lowest peak amplitude values. For example, the background noise threshold 606 value may be selected such to include the peak amplitude values from the lowest 10% of the small frames 604, such as frames 604C and 604D from the signal graph 602 in FIG. 6.

Figure 7:
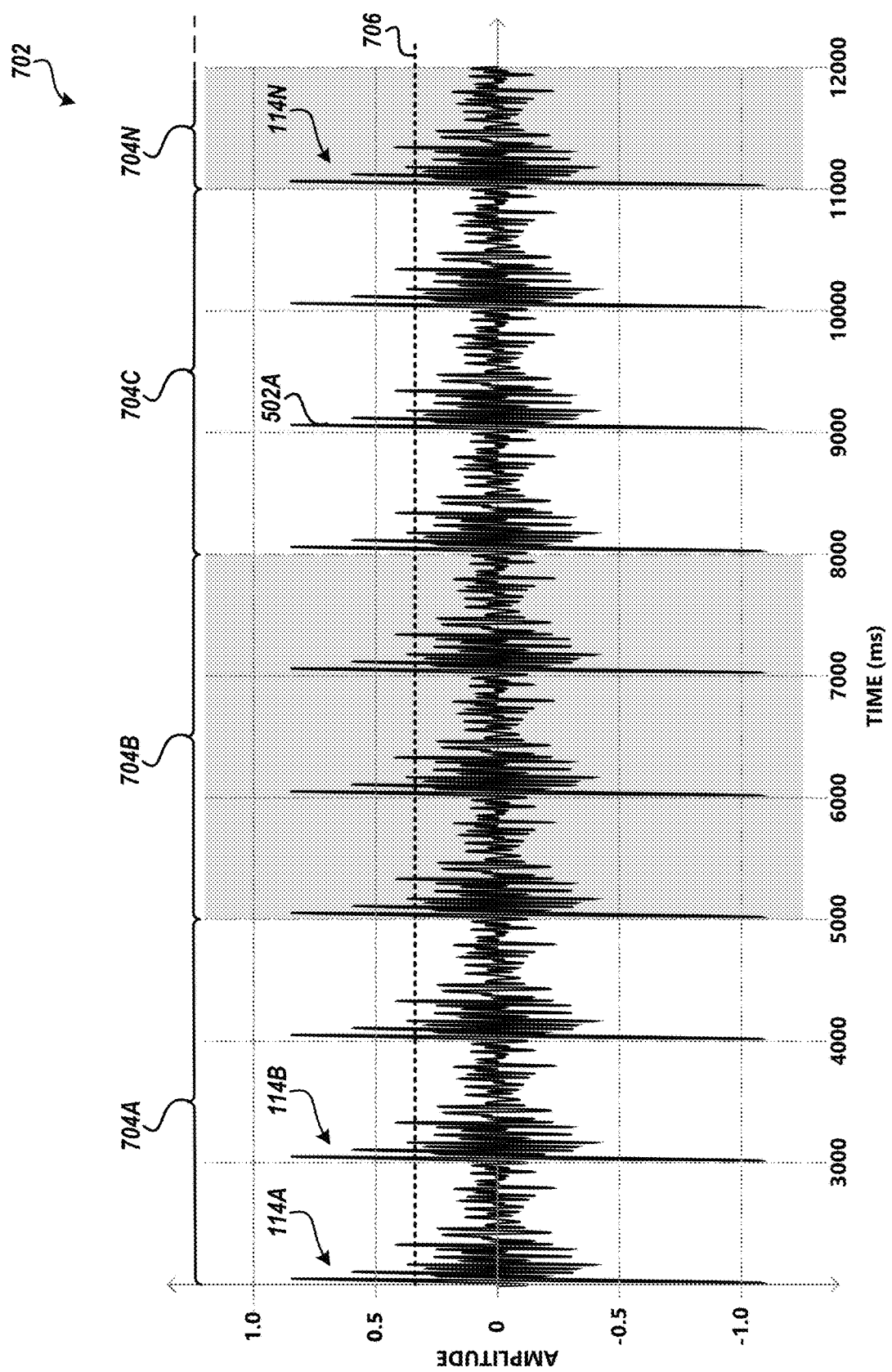
FIG. 7 is a signal graph of a portion of exemplary signal data recorded from a near acoustic sensor showing the signal data divided into large time-division frames, according to embodiments presented herein.

Next the signal data 502A from the near acoustic sensor 106A is divided into large time-division frames, such as frames 704A-704N (referred to herein generally as large frames 704), as shown in the signal graph 702 of FIG. 7. The size of the large frames 704 may be selected such that the frames are larger than the interval of the acoustical impulses 114A-114N. For example, if the acoustical impulse generator 104 is driven to deliver one acoustical impulse 114 approximately every second, the signal data 502A from the near acoustic sensor 106A may be divided into large frames 704 representing 3.0 seconds, such that each frame is guaranteed to contain at least one acoustical impulse. Again, a peak amplitude is determined in each of the large frames 704, and a median value of the peak amplitude of the large frames is calculated. While some large frames 704 may contain spurious signal data from traffic noise, construction, etc., the median of the maximum values from the large frames should be representative of a typical acoustical impulse 114.

A value for an impulse threshold 706 is then selected between the background noise threshold 606 and the median value of the peak amplitude of the large frames 704. For example, the impulse threshold 706 value may be computed to be ¼ of the interval between the background noise threshold and the median peak amplitude. The acoustic analysis module 126 may then determine the coarse timing of each acoustical impulse 114A-114N in the signal data 502A using the impulse threshold value, e.g., by detecting where the power in the signal first exceeds the impulse threshold 706 after a relative quiescent period.

Figure 8:
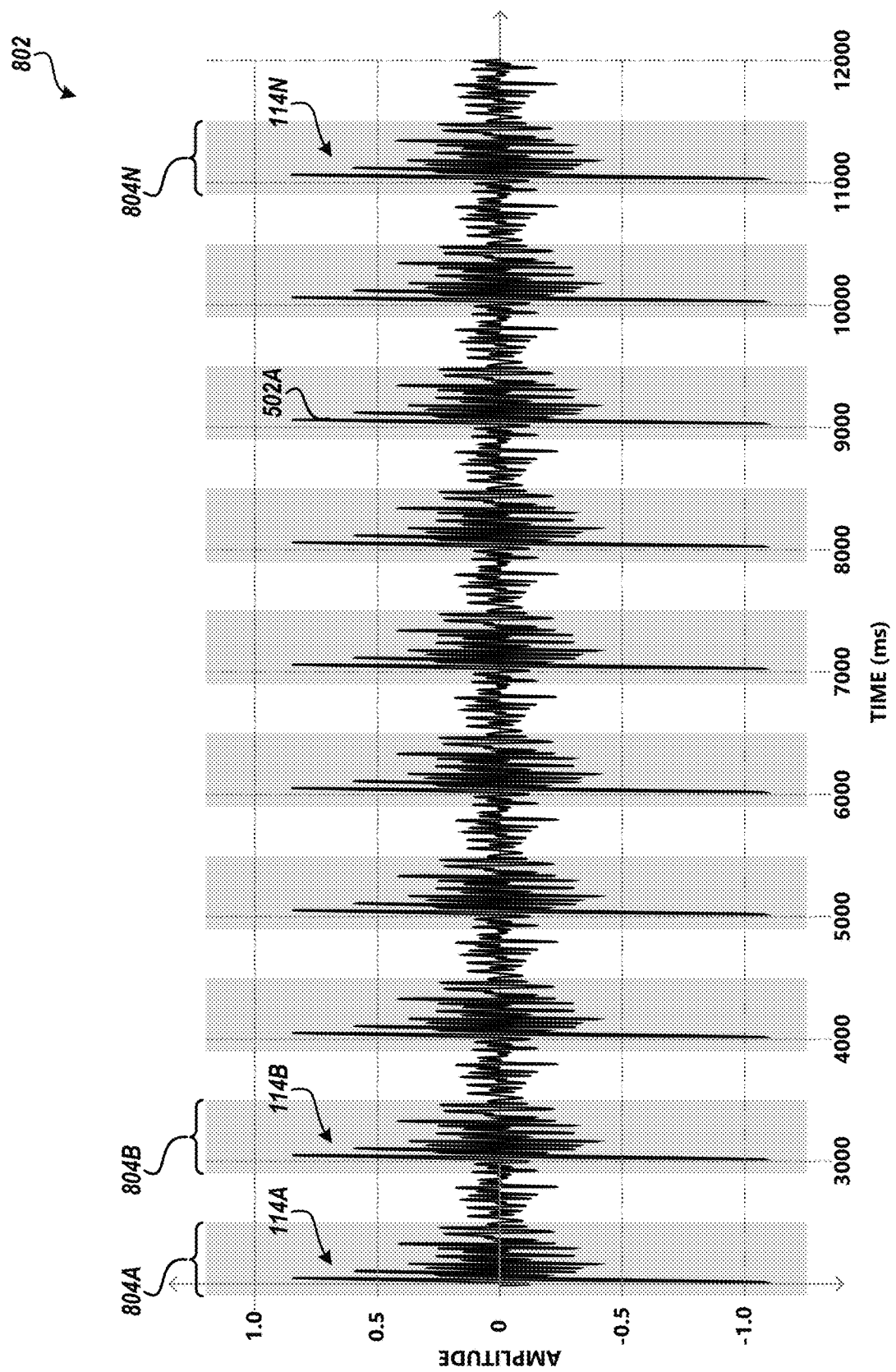
FIG. 8 is a signal graph of a portion of exemplary signal data recorded from a near acoustic sensor showing a series of time windows encompassing acoustical impulses in the signal data, according to embodiments presented herein.

From step 406, the routine 400 proceeds to step 408, where the acoustic analysis module 126 selects the signal data relevant to each acoustical impulse 114 from the signal data 502A by choosing a time window of fixed duration that encompasses the entire impulse. For example, the acoustic analysis module 126 may create time windows of ⅛ second before the coarse timing of each acoustical impulse 114A-114N to ½ second after the coarse timing of the impulse, such as time windows 804A-804N (referred to herein generally as time windows 804), as shown in the signal graph 802 of FIG. 8. The position and width of the encompassing fixed time windows 804 may be parametric, and may vary based on frequency and/or period of acoustical impulse generation, type of pipe or fluid therein, length of the target pipe segment 112, and the like.

The routine 400 proceeds from step 408 to step 410, where the acoustic analysis module 126 selects one of the acoustical impulses from the signal data 502A as a prototypical impulse. The selection of a prototypical impulse allows the acoustic analysis module 126 to more likely identify acoustical impulses 114 in the signal data 502A than other impulses from spurious noise, such that may occur when a car travels over a pipe or a steel road plate. According to some embodiments, one method for selecting a prototypical impulse from the acoustical impulses 114 in the signal data 502A comprises correlating the signal data inside each fixed time window 804 with the signal data inside all other of the fixed time windows and selecting the maximum correlation coefficient for each unique pair. For each acoustical impulse 114 in a fixed time window 804, the acoustic analysis module 126 may then sum or average the maximum correlation coefficients with all of the other impulses, and select the acoustical impulse with the highest sum or average as the prototypical impulse.

For large signal data 502A containing numerous acoustical impulses 114, this may represent a very resource intensive process. According to further embodiments, the acoustic analysis module 126 may first align the acoustic impulses 114 to their maxim local peaks. With the signals pre-aligned, it is only necessary to compute one correlation coefficient for each unique pair of acoustical impulses 806 as a measure of their similarity. This may be a faster and less resource-intensive computing task than performing correlation between the entire signal data 502 in the corresponding fixed time windows 804 for each impulse pair.

Figure 9:
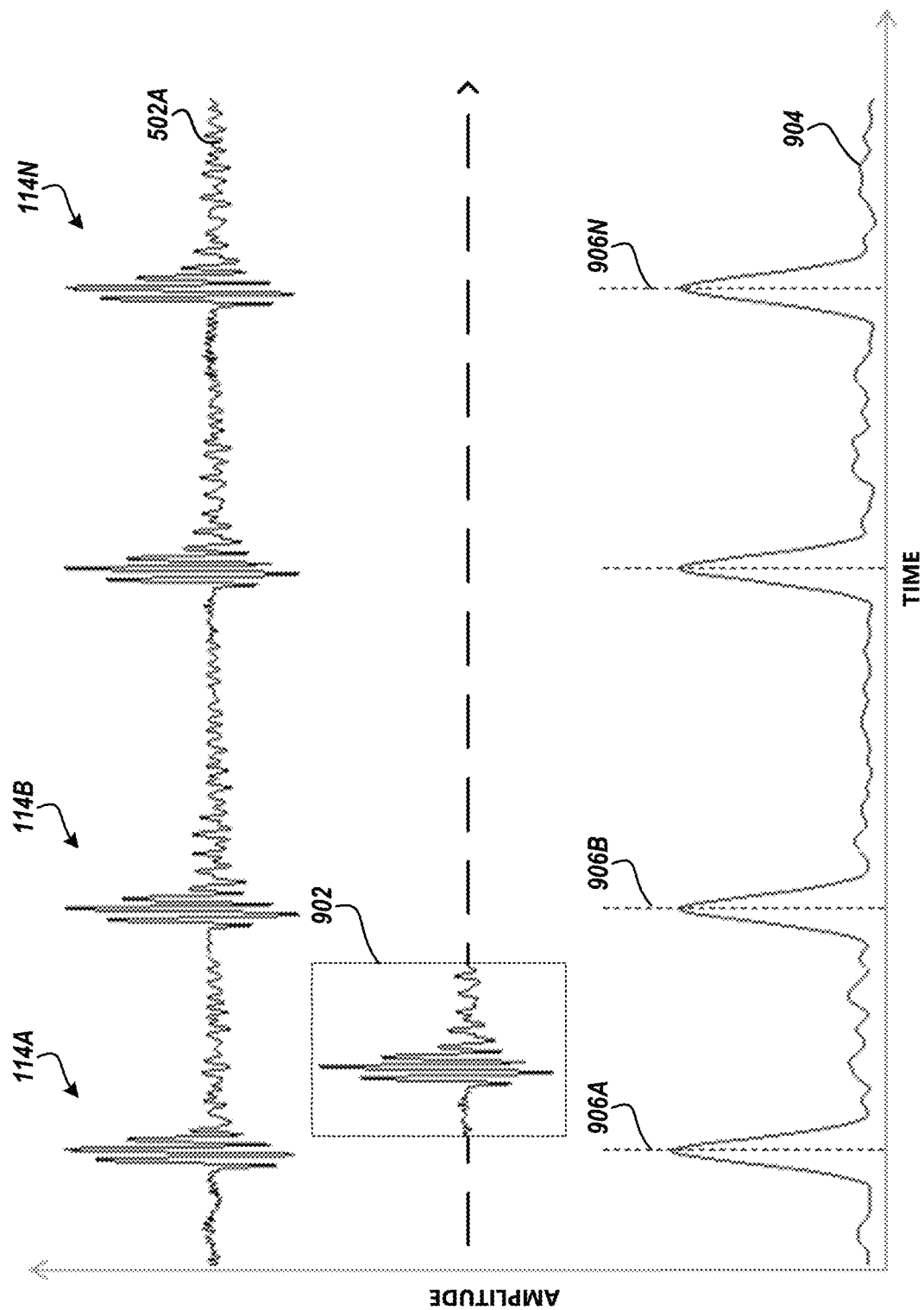
FIG. 9 is composite signal graph showing the application of a prototypical impulse to signal data to recover precise timings of acoustical impulses in the signal data, according to embodiments presented herein.

Next, at step 412, the acoustic analysis module 126 utilizes the selected prototypical impulse, such as the prototypical impulse 902 shown in FIG. 9, to recover the precise timing of each of the acoustical impulses 114 in the signal data 502A. According to some embodiments, this may be accomplished by cross-correlating the prototypical impulse 902 with the entire signal data 502A—essentially sliding the signal data in the fixed time window 804B encompassing the prototypical impulse 902 sample-by-sample through the signal data 502A while calculating a correlation coefficient between the data in the fixed time window 804B and the signal data at that sample position, as shown at 1104. The timing of each acoustical impulse 114 in signal data 502A may be obtained from local maximums in the correlation coefficient, i.e., the times of the sample where the correlation coefficient peaks, as further shown at 906A-906N in FIG. 9, allowing a more precise time for each impulse to be determined than the coarse timing of each acoustical impulse determined in step 406.

Figure 10A:
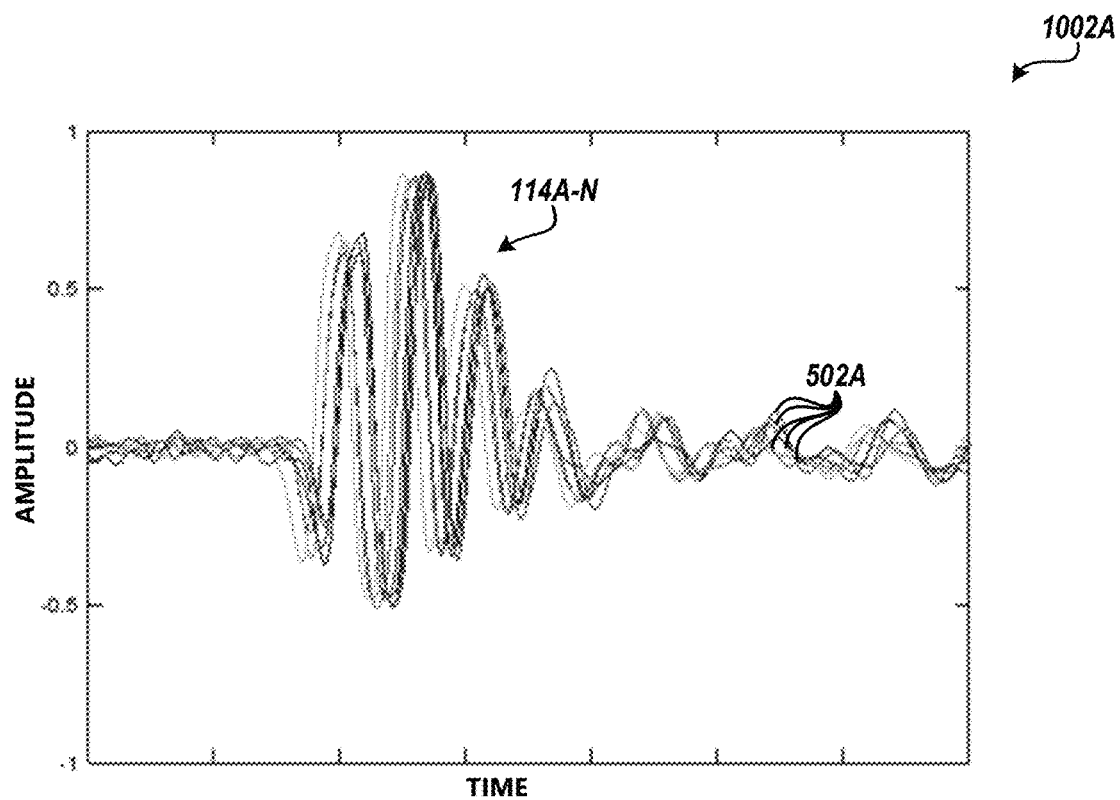
FIGS. 10A and 10B are composite signal graphs comparing acoustical impulses aligned without the recovered precise timings and aligned with the recovered precise timings, according to embodiments presented herein.
Figure 10B:
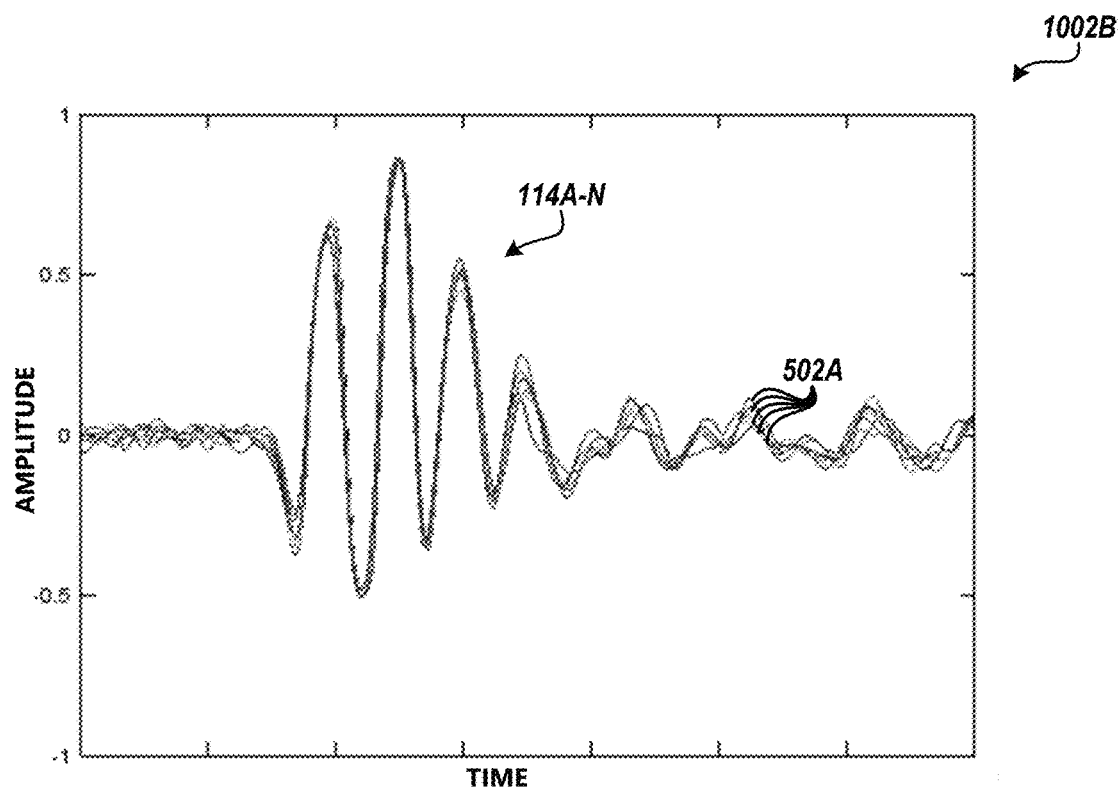

For illustrative purposes, FIGS. 10A and 10B show composite signal graphs 1002A and 1002B showing the acoustical impulses 114A-N from the near signal data 502A aligned utilizing the coarse timings from step 406 and the precise timings recovered in step 412, respectively. As may be seen in FIG. 10B, the acoustical impulses 114A-N could be aligned utilizing the recovered precise timings. Averaging these aligned impulses will result in improved SNR since the peaks in the impulses are aligned but the background noise is not. Thus the averaging process cancels out the noise.

Recovering a precise timing of each acoustical impulse 114 in the near signal data 502A may be desirable because, despite the initiation of impulse generation by the acoustical impulse generator 104 at a known time and at a known period of impulses, there may be no precise measurement of the exact timing of the impact or "tapping" causing the impulses. This may be due to mechanical or electrical variations in the, e.g., motorized hammer or piston that is utilized by the acoustical impulse generator 104 to strike the pipe or component, or variations in timing that may naturally occur in manual excitation of the pipe, e.g., by a human with a conventional hammer. In alternative embodiments, if precise timing of the impacts or tapping can be obtained from the acoustical impulse generator 104 (or from a sensor in very close proximity to the acoustical impulse generator, the need for steps 406-412 of the routine 400 to recover the precise timing of the impulses 114 from the signal data 502A can be eliminated.

Figure 11:
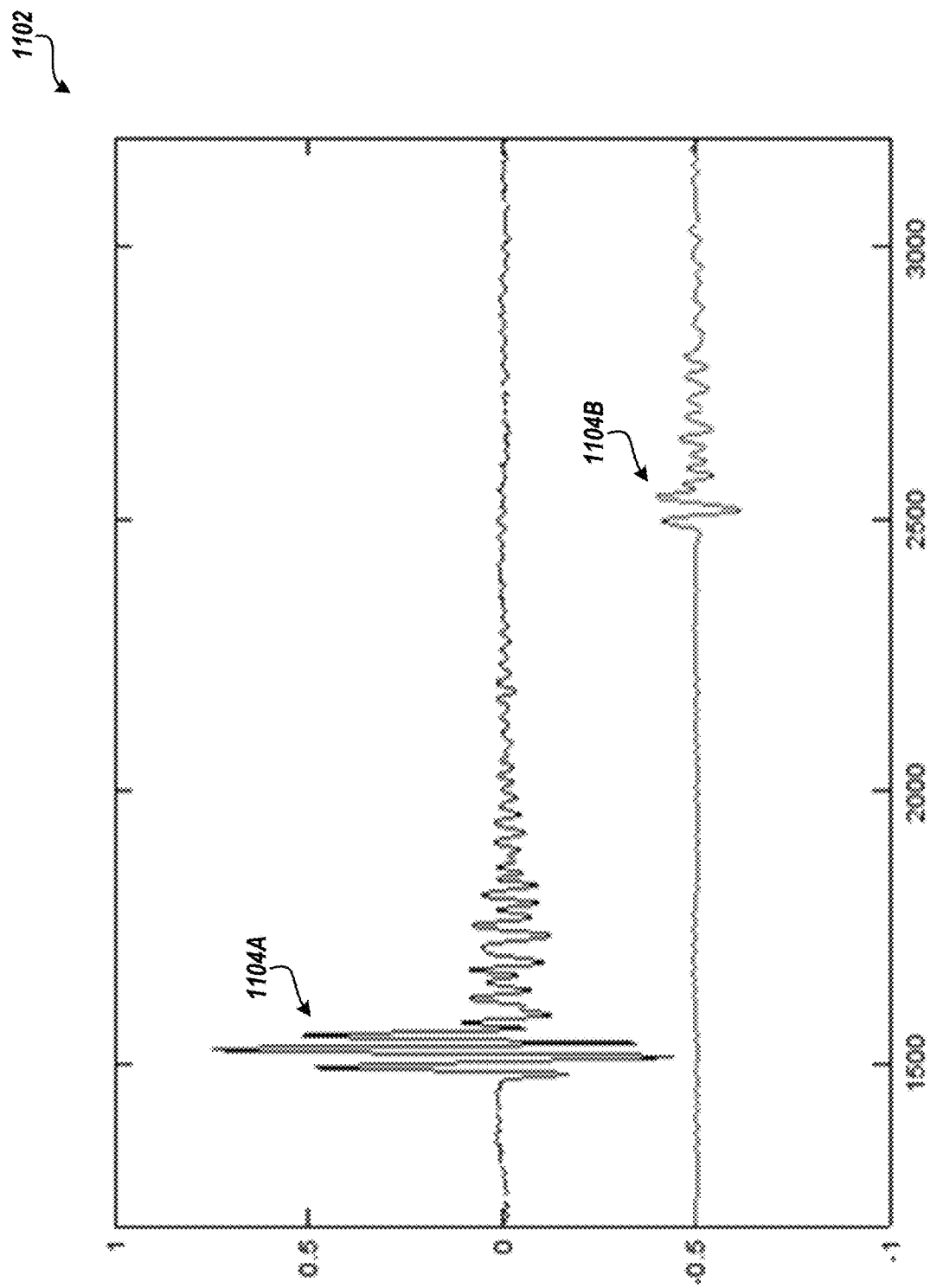
FIG. 11 is a composite signal graph showing average impulses computed from signal data from the near and far acoustic sensors, according to embodiments presented herein.

From step 412, the routine 400 proceeds to step 414, where the acoustic analysis module 126 utilizes the precise timings of the acoustical impulses 114 to average the impulses in the signal data 502A for the near acoustic sensor 106A into a single average pulse. For example, an average amplitude may be calculated over the samples in the fixed time windows 804 encompassing each acoustical impulse 114 aligned using the precise timings recovered in step 412. This results in a near-sensor average impulse 1104A as shown in the signal graph 1102 of FIG. 11.

Figure 4B:
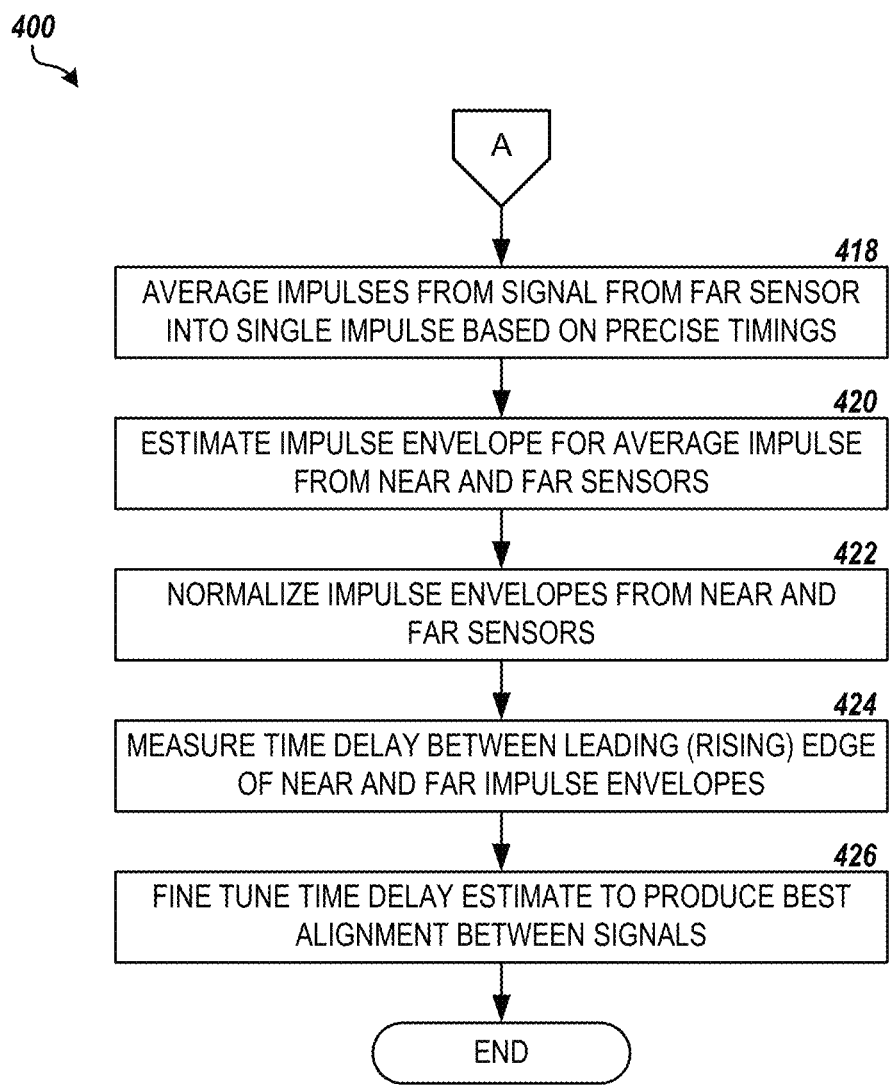

The routine 400 proceeds from step 414 to step 416, where the acoustic analysis module 126 utilizes the same precise timings recovered in step 412 to select the acoustic impulses 114 in the signal data 502B from the far acoustic sensor 106B. According to some embodiments, the width of the fixed time windows 804 determined from the signal data 502A from the near acoustic sensor 106A may be set to encompass the same impulse in the signal data 502B from the far acoustic sensor 106B, based on knowledge of the length of the target pipe segment 1121 and an estimated speed of sound in the pipe 102. Utilizing these same fixed time windows 804 aligned with the precise timings recovered in step 412, the acoustic analysis module 126 may identify the acoustical impulses 114 in the far signal data 502B. At step 418, as shown in FIG. 4B, the acoustic analysis module 126 may then average the identified acoustical impulses 114 in the signal data 502B from the far acoustic sensor 106B into a far-sensor average impulse 1104B, as further shown in FIG. 11, using a same method as utilized in step 414.

Figure 12:
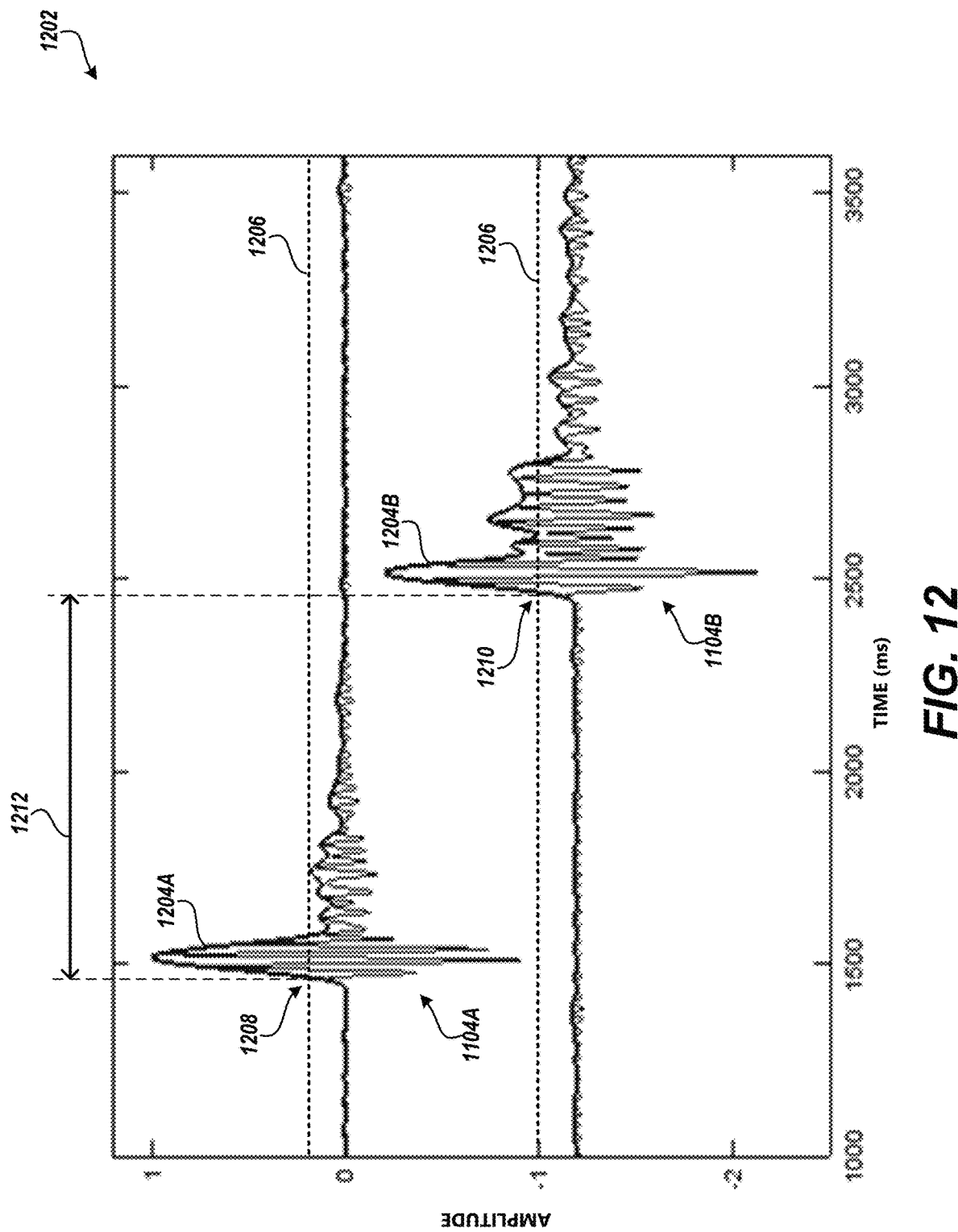
FIG. 12 is a composite signal graph showing impulse envelopes computed from the average acoustical impulses from the near and far acoustic sensors and an estimation of a time delay between the signals, according to embodiments presented herein.

From step 418, the routine 400 proceeds to step 420, where the acoustic analysis module 126 estimates an impulse envelope for each of the near-sensor average impulse 1104A and the far-sensor average impulse 1104B. For example, the acoustic analysis module 126 may apply a Hilbert transform over the two average impulses 1104A and 1104B within the encompassing fixed time windows 804 to produce the respective near-sensor estimated impulse envelope 1204A and far-sensor estimated impulse envelope 1204B, as shown in FIG. 12. According to embodiments, the estimated impulse envelopes 1204A and 1204B retain their position along the time axis from the respective average impulses 1104A and 1104B. In further embodiments, the acoustic analysis module 126 may simply apply an absolute value function to the amplitude of the signal data 502A and 502B from the respective average impulses 1104A and 1104B and calculate a bounding function from the resulting positive signal to produce the estimated impulse envelopes 1204A and 1204B. In addition, the acoustic analysis module 126 may normalize the estimated impulse envelopes 1204A and 1204B to a consistent maximum value (e.g., 1.0), as shown at step 422. In further embodiments, the acoustic analysis module 126 may first normalize the signal data for average impulses 1104A and 1104B to the consistent maximum value before the corresponding estimated impulse envelopes 1204A and 1204B are computed, as further illustrated in FIG. 12.

The routine 400 proceeds from step 422 to step 424, where the acoustic analysis module 126 estimates a time delay between the arrival of the acoustical impulses 114 at the near and far acoustic sensors 106A and 106B by measuring a time difference between the rising (leading) edge of the two impulse envelopes 1204A and 1204B estimated from the average impulses 1104A and 1104B in step 420. As further shown in FIG. 12, a point along the rising edge of the normalized near-sensor estimated impulse envelope 1204A may be determined that represents a starting point of the acoustical impulse 114. For example, where the leading edge of the near-sensor estimated impulse envelope 1204A crosses a threshold 1206 representing 20% of the interval from the background noise threshold 606 to the normalized peak amplitude (1.0) noise (referred to herein as the T20 threshold 1206), as shown at 1208 in FIG. 12. A same point 1210 is determined for the leading edge of the normalized far-sensor impulse envelope 1204B, and the time difference 1212 between the two points 1208 and 1210 provides the value for the estimated time delay between the arrival of the acoustical impulses at the near and far acoustic sensors 106A and 106B, respectively. This time delay value may then be utilized to calculate a speed of sound in the target pipe segment 112 over the known distance d to be utilized in pipe condition assessment or other algorithms requiring an accurate measurement of the speed of sound in the pipe(s).

In further embodiments, the routine 400 proceeds from step 424 to step 426, where the acoustic analysis module 126 may refine the time delay estimate utilizing correlation of the near-sensor average impulse 1104A and the far-sensor average impulse 1104B. Simply correlating the signal data from the average impulses 1104A and 1104B may not produce an accurate time delay estimate, however, since the average impulses still contain peaks from both the initial impact of the tapping on the pipe or component as wells as from reverberation, reflections, harmonics, and the like. Instead, the acoustic analysis module 126 may utilize a mask to limit the data utilized for correlation to the initial portion of each average impulse 1104A and 1104B.

Figure 13:
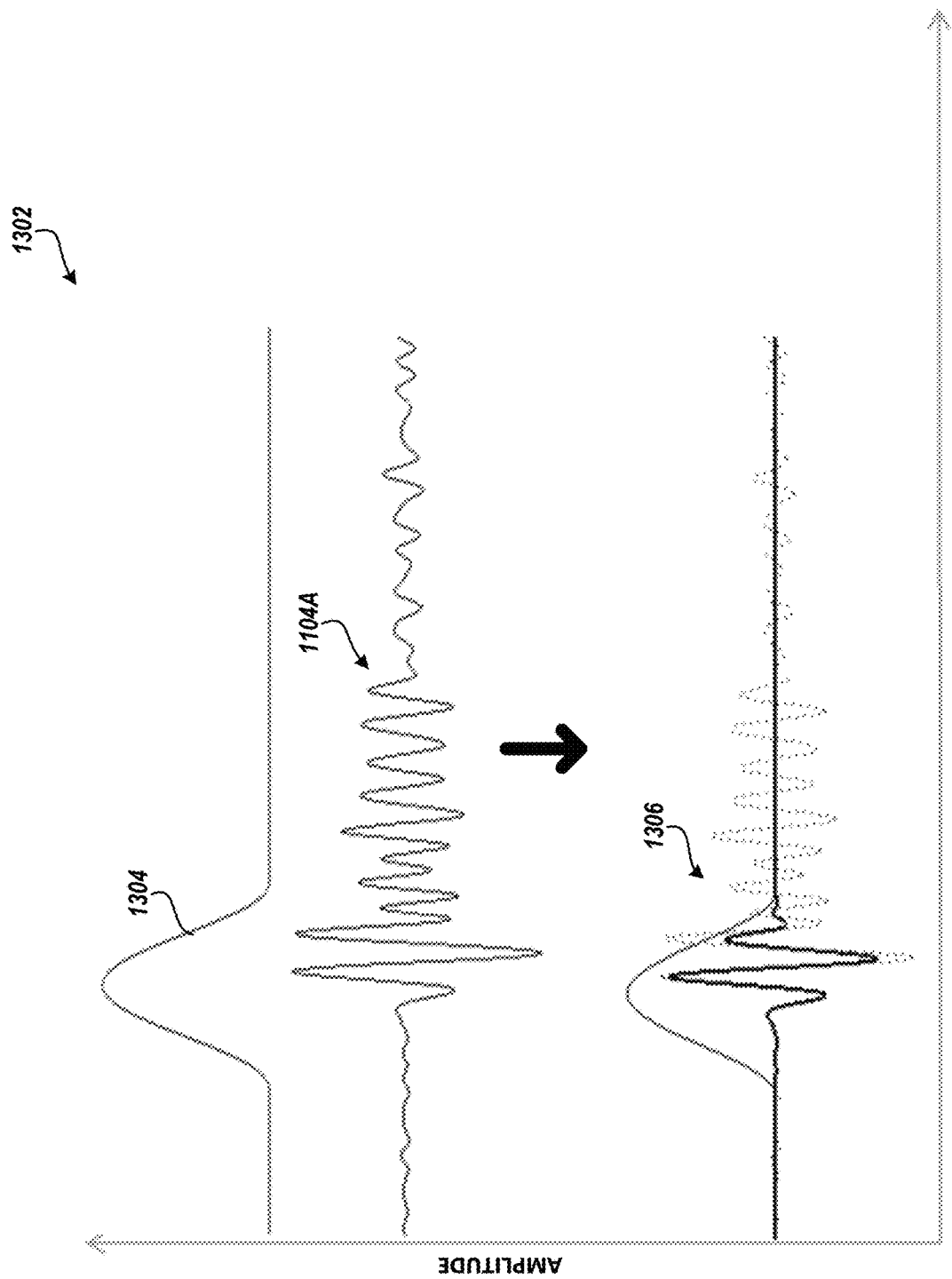
FIG. 13 is a composite signal graph showing the application of a signal mask to the average impulse to produce a mask impulse signal, according to embodiments presented herein.

For example, as shown in FIG. 13, a mask 1304 may be applied to the near-sensor average impulse 1104A producing a masked signal 1306 representing the beginning of the acoustical impulses 114 in the near signal data 502A, i.e., the arrival of the impulses from the initial impact at the near acoustic sensor 106A. Peaks in the tail of the acoustic impulse signals representing reflections and other distortions are removed from the masked signal 1306. According to some embodiments, the mask 1304 may be centered at the times corresponding to the point 1208 in the near-sensor estimated impulse envelope 1204A utilized to determine the estimated time delay in step 424. In some embodiments, the width of the mask 1304 may be determined from wavelength of the acoustical impulses 114 and may be set to include two or three periods from the leading edge. In further embodiments, the width and position of the mask 1304 may be parametric with optimal values determined experimentally. The same mask 1304 is applied to both the near-sensor average impulse 1104A and the far-sensor average impulse 1104B to limit the signal data for correlation.

Figure 14:
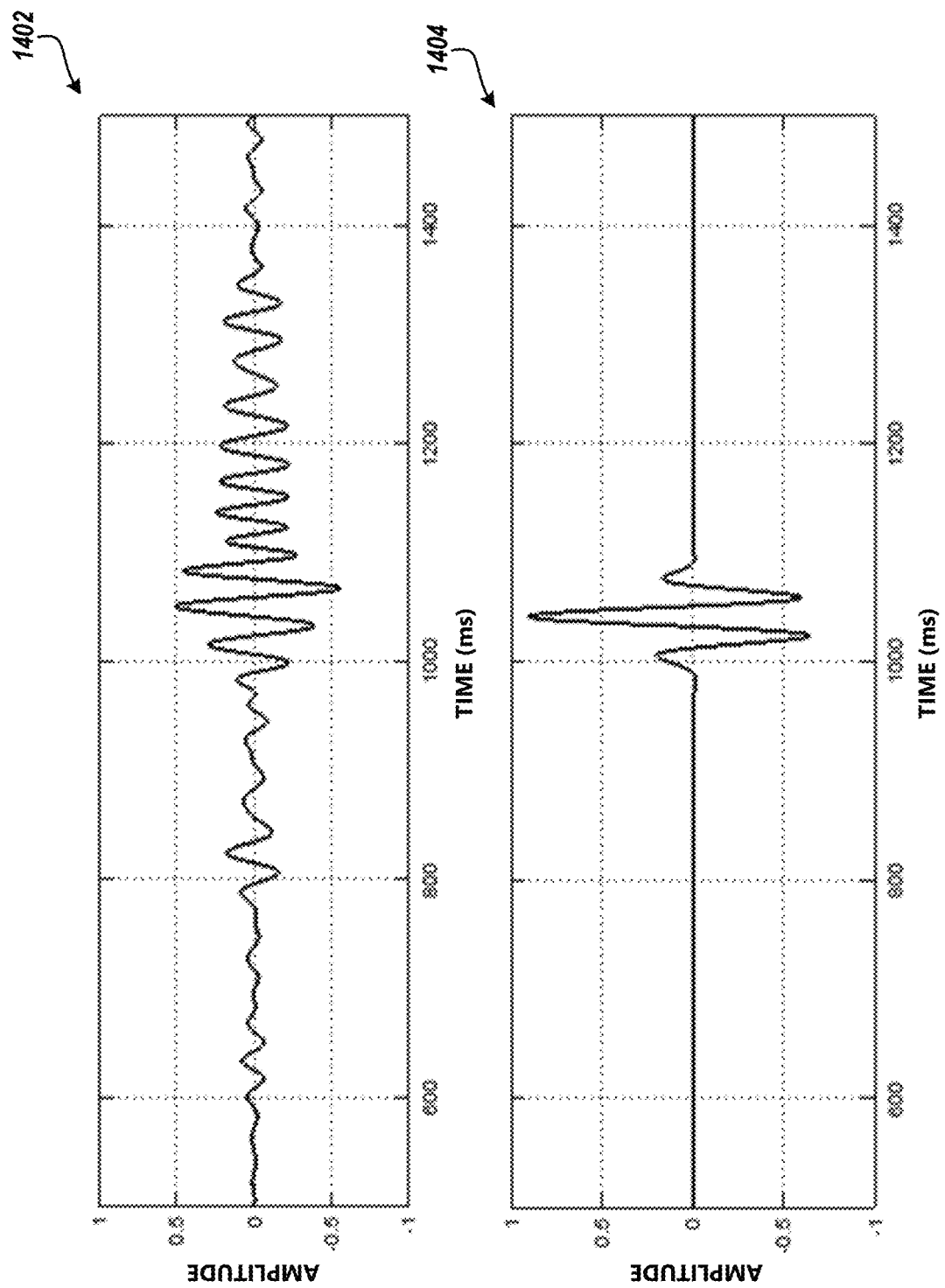
FIG. 14 shows correlation signal graphs illustrating a difference between correlating masked average impulse signals and unmasked average impulse signals, according to embodiments presented herein.

Alternatively, the signal data 502 for the average impulses 1104A and 1104B may be limited to a certain number of peaks in the signal before and after the times corresponding to the points 1208 and 1210 in the respective estimated impulse envelopes 1204A and 1024B. Similarly to the properties of the mask 1304, the number of peaks to utilize in the pre-point and post-point signal data 502 may be parametric with optimal values determined experimentally. A cross-correlation may then be performed between the respective masked signals 1306 or the otherwise limited signal data from the near and far average impulses 1104A and 1104B to produce a more precise estimate of the time delay. For example, as may be seen in FIG. 14, the graph 1402 shows a cross-correlation between the near-sensor average impulse 1104A and the far-sensor average impulse 1104B without masking or other limitations, while the graph 1404 shows the cross-correlation between the masked signals 1306 corresponding to the near and far average impulses 1104A and 1104B. From step 426, the routine 400 ends.

Based on the foregoing, it will be appreciated that technologies for improving predictions of the condition of pipes of a fluid distribution system by accurate time delay estimation using coherent averaging are presented herein. The above-described embodiments are merely possible examples of implementations set forth for a clear understanding of the principles of the present disclosure. Many variations and modifications may be made to the above-described embodiments without departing substantially from the spirit and principles of the present disclosure. All such modifications and variations are intended to be included within the scope of the present disclosure, and all possible claims to individual aspects or combinations and sub-combinations of elements or steps are intended to be supported by the present disclosure.

The logical steps, functions or operations described herein as part of a routine, method or process may be implemented (1) as a sequence of processor-implemented acts, software modules or portions of code running on a controller or computing system and/or (2) as interconnected machine logic circuits or circuit modules within the controller or other computing system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

What is claimed is:

1. A method for measuring a speed of sound in a pipe segment of a fluid distribution system, the method comprising steps of:
   generating a plurality of out-of-bracket acoustical impulses in the pipe segment;
   recording signal data from a first acoustic sensor in acoustical communication with the pipe at a first location at one end of the pipe segment and a second acoustic sensor in acoustical communication with the pipe at a second location at the other end of the pipe segment, the signal data representing the plurality of out-of-bracket acoustical impulses sensed at the first location and the second location along the pipe segment;
   obtaining precise timings for the generation of each of the plurality of out-of-bracket acoustical impulses;
   aligning each of the plurality of out-of-bracket acoustical impulses in the signal data recorded from the first location using the precise timings and averaging the aligned acoustical impulses to produce a near-sensor average impulse;
   aligning each of the plurality of out-of-bracket acoustical impulses in the signal data recorded from the second location using the precise timings and averaging the aligned acoustical impulses to produce a far-sensor average impulse;
   estimating a time delay between arrival of the plurality of out-of-bracket acoustical impulses at the first and second locations from the timing of the near-sensor average impulse and the far-sensor average impulse; and
   calculating a speed of sound in the pipe segment based on the estimated time delay and a distance between the first location and the second location along the pipe segment.

2. The method of claim 1, wherein estimating the time delay from the timing of the near-sensor average impulse and the far-sensor average impulse comprises:
   computing signal envelopes for the near-sensor average impulse and the far-sensor average impulse; and measuring a time between a point on a rising edge of the signal envelope computed for the near-sensor average impulse and a corresponding point on the rising edge of the signal envelope computed for the far-sensor average impulse.

3. The method of claim 2, wherein estimating the time delay from the timing of the near-sensor average impulse and the far-sensor average impulse further comprises:
computing signal masks centered around the points on the rising edges of the signal envelopes computed for the near-sensor average impulse and the far-sensor average impulse;
limiting the signal data for the near-sensor average impulse and the far-sensor average impulse utilizing the signal masks; and
performing a correlation between the limited signal data for the near-sensor average impulse and the limited signal data for the far-sensor average impulse to refine the estimated time delay.

4. The method of claim 1, wherein the precise timings of the plurality of out-of-bracket acoustical impulses are recovered from the signal data recorded from the first location by:
selecting a prototypical impulse from the plurality of out-of-bracket acoustical impulses in the signal data;
cross-correlating a fixed time window encompassing the prototypical impulse with the signal data to calculate a correlation coefficient at each sample position; and
determining a precise timing for each acoustical impulse in the plurality of out-of-bracket acoustical impulses based on corresponding local maximums in the correlation coefficient.

5. The method of claim 4, wherein selecting the prototypical impulse from the plurality of out-of-bracket acoustical impulses comprises:
calculating an impulse threshold from the signal data;
determining a coarse timing for each acoustical impulse in the plurality of out-of-bracket acoustical impulses based on the impulse threshold;
selecting a fixed time window encompassing each acoustical impulse in the plurality of out-of-bracket acoustical impulses based on the impulse threshold;
correlating the signal data within each fixed time window encompassing each acoustical impulse with the fixed time windows encompassing all other acoustical impulses to calculate a similarity score between each unique pair of acoustical impulses; and
selecting the acoustical impulse with the highest average similarity score with all of the other acoustical impulses as the prototypical impulse.

6. The method of claim 1, wherein the plurality of out-of-bracket acoustical impulses are generated by an acoustic impulse generator in acoustical communication with the pipe containing the pipe segment.

7. The method of claim 6, wherein the acoustic impulse generator comprises a mechanical device configured to introduce an impact to an outer wall of the pipe.

8. The method of claim 6, wherein the precise timings for the generation of the plurality of out-of-bracket acoustical impulses are obtained from a sensor in close proximity to the acoustic impulse generator.

9. The method of claim 1, wherein the signal data representing the plurality of out-of-bracket acoustical impulses are sensed at the first location and the second location using acoustic sensors attached to a wall of the pipe at the respective locations.

10. The method of claim 1, wherein the calculated speed of sound in the pipe segment is utilized by a pipe condition assessment algorithm.

11. A non-transitory computer-readable medium containing processor-executable instructions that, when executed by a computing system, causes the computing system to:
receive a first signal data from a first acoustic sensor and a second signal data from a second acoustic sensor, the first signal data and second signal data representing a plurality of acoustical impulses sensed at a first location and a second location, respectively, bracketing a pipe segment of a pipe in a fluid distribution system;
recover precise timing for each of of the plurality of acoustical impulses from the first signal data;
align each of the plurality of acoustical impulses in the first signal data using the precise timings and average the aligned acoustical impulses to produce a near-sensor average impulse;
align each of the plurality of acoustical impulses in the second signal data using the precise timings recovered from the first signal data and average the aligned acoustical impulses to produce a far-sensor average impulse;
estimate a time delay between arrival of the plurality of acoustical impulses at the first and second locations from the timing of the near-sensor average impulse and the far-sensor average impulse; and
calculate a speed of sound in the pipe segment based on the estimated time delay and a length of the pipe segment between the first acoustic sensor and the second acoustic sensor.

12. The non-transitory computer-readable medium of claim 11, wherein estimating the time delay from the timing of the near-sensor average impulse and the far-sensor average impulse comprises:
computing signal envelopes for the near-sensor average impulse and the far-sensor average impulse; and
measuring a time between a point on a rising edge of the signal envelope computed for the near-sensor average impulse and a corresponding point on the rising edge of the signal envelope computed for the far-sensor average impulse.

13. The non-transitory computer-readable medium of claim 11, wherein recovering the precise timings of the plurality of acoustical impulses in the signal data comprises:
selecting a prototypical impulse from the plurality of acoustical impulses in the first signal data;
sliding a fixed time window encompassing the prototypical impulse sample-by-sample through the first signal data while calculating a correlation coefficient between the signal data in the fixed time window and the first signal data at each sample position; and
determining a precise timing for each acoustical impulse in the plurality of acoustical impulses based on corresponding local maximums in the correlation coefficient.

14. The non-transitory computer-readable medium of claim 13, wherein selecting the prototypical impulse from the plurality of acoustical impulses comprises:
calculating an impulse threshold from the first signal data;
determining a coarse timing for each acoustical impulse in the plurality of acoustical impulses based on the impulse threshold;
selecting a fixed time window encompassing each acoustical impulse in the plurality of acoustical impulses based on the impulse threshold;
correlating the signal data within each fixed time window encompassing each acoustical impulse with the fixed time windows encompassing all other acoustical impulses to calculate a similarity score between each unique pair of acoustical impulses; and selecting the acoustical impulse with the highest total similarity scores with all of the other acoustical impulses as the prototypical impulse.

15. The non-transitory computer-readable medium of claim 11, wherein the plurality of acoustical impulses are generated by an acoustic impulse generator in acoustical communication with the pipe at a point outside the pipe segment bracketed by the first acoustic sensor and the second acoustic sensor.

16. The non-transitory computer-readable medium of claim 15, wherein the acoustic impulse generator comprises a mechanical device configured to introduce an impact to one of an outer wall of the pipe and a component of the fluid distribution system.

17. A water distribution system comprising:

an acoustical impulse generator in acoustical communication with a pipe in the water distribution system, the acoustical impulse generator configured to generate a plurality of acoustical impulses in the pipe;

a first acoustic sensor in acoustical communication with the pipe at a first location and configured to sense the plurality of acoustical impulses in the pipe and produce first signal data representing the sensed acoustical impulses;

a second acoustic sensor in acoustical communication with the pipe at a second location and configured to sense the plurality of acoustical impulses in the pipe and produce second signal data representing the sensed acoustical impulses; and an acoustic analysis module executing on a pipe assessment system, the acoustic analysis module configured to receive the first signal data and the second signal data, select a prototypical impulse from the plurality of acoustical impulses in the first signal data, slide a fixed time window encompassing the prototypical impulse sample-by-sample through the first signal data while calculating a correlation coefficient between the signal data in the fixed time window and the first signal data at each sample position, determine a precise timing for each acoustical impulse in the plurality of acoustical impulses based on corresponding local maximums in the correlation coefficient, align each of the plurality of acoustical impulses in the first signal data based on the precise timings and average the aligned acoustical impulses to produce a near-sensor average impulse, align each of the plurality of acoustical impulses in the second signal data based on the precise timings and average the aligned acoustical impulses to produce a far-sensor average impulse, compute signal envelopes for the near-sensor average impulse and the far-sensor average impulse, estimate a time delay between arrival of the plurality of acoustical impulses at the first and second locations by measuring a time between a point on a rising edge of the signal envelope computed for the near-sensor average impulse and a corresponding point on the rising edge of the signal envelope computed for the far-sensor average impulse, and calculate a speed of sound in the pipe based on the estimated time delay and a distance between the first location and the second location along the pipe.

18. The water distribution system of claim 17, wherein the acoustic analysis module is further configured to:

compute signal masks centered around the points on the rising edges of the signal envelopes computed for the near-sensor average impulse and the far-sensor average impulse;

mask the near-sensor average impulse and the far-sensor average impulse utilizing the signal masks; and perform a correlation between the masked near-sensor average impulse and the masked far-sensor average impulse to refine the estimated time delay.

19. The water distribution system of claim 17, wherein the acoustic impulse generator is located at a position along the pipe outside of a pipe segment bracketed by the first location and the second location.

20. The water distribution system of claim 17, wherein the the calculated speed of sound in the pipe is utilized by the pipe assessment system to determine a condition of the pipe.

* * * * *